US 6,906,639 B2
*Jun. 14, 2005

United States Patent
Lemelson et al.

(54) MOTOR VEHICLE WARNING AND CONTROL SYSTEM AND METHOD

(76) Inventors: Jerome H. Lemelson, deceased, late of Incline Village, NV (US); by Dorothy Lemelson, legal representative, P.M.B. Box 284, Unit 802, 930 Tahoe Blvd., Incline Village, NV (US) 89451; Robert D. Pedersen, 7808 Gleneagle, Dallas, TX (US) 75248

( * ) Notice: Subject to any disclaimer, the term of this patent is extended or adjusted under 35 U.S.C. 154(b) by 176 days.

This patent is subject to a terminal disclaimer.

(21) Appl. No.: 10/420,395

(22) Filed: Apr. 21, 2003

(65) Prior Publication Data

US 2004/0022416 A1 Feb. 5, 2004

Related U.S. Application Data

(63) Continuation of application No. 08/671,853, filed on Jun. 28, 1996, now Pat. No. 6,553,130, which is a continuation of application No. 08/105,304, filed on Aug. 11, 1993, now abandoned.

(51) Int. Cl.$^7$ ............................ G08B 1/16; G06F 17/10; B62D 1/24
(52) U.S. Cl. ....................... 340/903; 340/435; 340/436; 180/167; 180/169; 180/271; 180/274; 180/280; 701/301
(58) Field of Search ................................. 340/903, 435, 340/436; 180/167, 169, 271, 274, 280; 701/301

(56) References Cited

U.S. PATENT DOCUMENTS 4,257,703 A   3/1981  Goodrich ....................... 356/4
4,626,850 A  12/1986  Chey ........................... 340/903
4,825,211 A   4/1989  Park ........................... 340/901

(Continued)

FOREIGN PATENT DOCUMENTS

| JP | 4-15799   | 1/1992 |
| JP | 4-219900  | 8/1992 |
| JP | 5-124529  | 5/1993 |
| JP | 5-143897  | 9/1993 |

OTHER PUBLICATIONS

Abu–Mostafa, "Information Theory, Complexity, and Neural Networks," *IEEE Communications*, pp. 25–28 (Nov. 1989).

Aggarwal et al., "On the Computation of Motion from Sequences of Images—A Review," *Proceedings of the IEEE*, pp. 917–935 (Aug. 1988).

Alspector, "Neural–Style Microsystems that Learn," *IEEE Communications*, pp. 29–36 (Nov. 1989).

(Continued)

Primary Examiner—Donnie L. Crosland
(74) Attorney, Agent, or Firm—Louis J. Hoffman

(57) ABSTRACT

A system and method assists the driver of a motor vehicle in preventing accidents or minimizing the effects of same. In one form, a television camera or other ranging device is mounted on a vehicle and scans the roadway ahead of the vehicle as the vehicle travels. Continuously generated video picture signals output by the camera are electronically processed and analyzed by a fuzzy-logic-based image analyzing computer mounted in the controlled vehicle, which generates control signals and applies them to control the operation of the accelerator, brake, and steering system of the vehicle in a coordinated way to attempt to avoid or lessen the effects of a collision. In a particular form, the decision computer may select the evasive action taken from a number of choices, depending on whether and where the detection device senses other vehicles and obstacles. Warning signals may also be generated.

8 Claims, 13 Drawing Sheets

U.S. PATENT DOCUMENTS

| | | | |
|---|---|---|---|
| 4,872,051 A | 10/1989 | Dye | 340/903 |
| 4,901,362 A | 2/1990 | Terzian | 382/103 |
| 4,926,170 A | 5/1990 | Beggs et al. | 340/904 |
| 4,931,937 A | 6/1990 | Kakinami et al. | 180/169 |
| 4,933,852 A | 6/1990 | Lemelson | 340/439 |
| 4,969,038 A | 11/1990 | Lemelson | 358/107 |
| 4,979,029 A | 12/1990 | Lemelson | 358/93 |
| 5,018,689 A | 5/1991 | Yasunobu et al. | 395/905 |
| 5,039,217 A | 8/1991 | Maekawa et al. | 356/1 |
| 5,081,585 A | 1/1992 | Kurami et al. | 364/424.02 |
| 5,091,726 A | 2/1992 | Shyu | 340/904 |
| 5,122,796 A | 6/1992 | Beggs et al. | 340/904 |
| 5,146,219 A | 9/1992 | Zechnall | 340/905 |
| 5,154,904 A | 10/1992 | Summer et al. | 340/905 |
| 5,161,107 A | 11/1992 | Mayeaux et al. | 340/937 |
| 5,177,462 A | 1/1993 | Kajiwara | 340/903 |
| 5,179,377 A | 1/1993 | Hancock | 340/961 |
| 5,189,619 A | 2/1993 | Adachi et al. | 395/905 |
| 5,197,562 A | 3/1993 | Kakinami et al. | 180/169 |
| 5,230,400 A | 7/1993 | Kakinami et al. | 180/169 |
| 5,249,157 A | 9/1993 | Taylor | 340/903 |
| 5,276,620 A | 1/1994 | Bottesch | 364/424.05 |
| 5,278,764 A | 1/1994 | Iizuka et al. | 364/461 |
| 5,298,882 A | 3/1994 | Tsai | 340/468 |
| 5,304,980 A | 4/1994 | Maekawa | 340/903 |
| 5,307,136 A | 4/1994 | Saneyoshi | 180/167 |
| 5,314,037 A | 5/1994 | Shaw et al. | 180/169 |
| 5,327,117 A | 7/1994 | Kohsaka | 340/459 |
| 5,332,057 A | 7/1994 | Butsuen et al. | 180/169 |
| 5,339,075 A | 8/1994 | Abst et al. | 340/903 |
| 5,341,344 A | 8/1994 | O'Brien et al. | 367/96 |
| 5,357,438 A | 10/1994 | Davidian | 180/169 |
| 5,369,591 A | 11/1994 | Broxmeyer | 340/903 |
| 5,545,960 A | 8/1996 | Ishikawa | 364/424.032 |
| 6,553,130 B1 * | 4/2003 | Lemelson et al. | 382/104 |

OTHER PUBLICATIONS

Casasent, "Optics and Neural Nets," Chapter 16 in Carpenter et al.,eds.,*Neural Networks for Vision and Image Processing*, pp. 437–448 (MIT Press 1992).

Cox, "Fuzzy Fundamentals," *IEEE Spectrum*, pp. 58–61 (Oct. 1992).

Hammerstrom, "Neural Networks at Work," *IEEE Spectrum*, pp. 26–32 (Jun. 1993).

Hush et al., "Progress in Supervised Neural Networks," *IEEE Signal Processing*, pp. 8–39 (Jan. 1993).

Jurgen, "Smart Cars and Highways Go Global," *IEEE Spectrum*, pp. 26–36 (May 1991).

Kittler et al., eds., *Image Processing System Architectures*, Chapter 4, pp. 49–81, and Chapter 5, pp. 85–101 (John Wiley & Sons 1985).

Kosko et al., "Fuzzy Logic," *Scientific American*, pp. 76–81 (Jul. 1993).

Lee, "Fuzzy Logic in Control Systems: Fuzzy Logic Controller, Part II," *IEEE Transaction on Systems, Man, and Cybernetics*, pp. 419–435 (vol. 20, No. 2, Mar./Apr. 1990).

Lippmann, "An Introduction to Computing with Neural Nets," *IEEE ASSP*, pp. 4–22 (Apr. 1987).

Lippmann, "Pattern Classification Using Neural Networks," *IEEE Communications*, pp. 47–50, 59–64 (Nov. 1989).

Lisboa, ed., *Neural Networks—Current Applications*, Chapter 1, pp. 1–34, Chapter 2, pp. 35–48, Chapter 7, pp. 123–147 (Chapman & Hall 1992).

Lupo, "Defense Applications of Neural Networks," *IEEE Communications*, pp. 82–88 (Nov. 1989).

Maresca et al., "Parallel Architectures for Vision," *Proceedings of the IEEE*, pp. 970–981 (vol. 76, No. 8, Aug. 1988).

Nijhuis et al., "Evaluation of Fuzzy and Neural Vehicle Control," *Institution of Electrical Engineers*, pp. 447–452 (1992).

Pearson, ed.,*Image Processing*, Chapter 8, pp. 141–155, and Chapter 10, pp. 169–189 (McGraw–Hill 1991).

Psaltis et al., "Optoelectronic Implementations of Neural Networks," *IEEE Communications*, pp. 37–40, 71 (Nov. 1989).

Roth, "Neural Networks for Extraction of Weak Targets in High Clutter Environments," *IEEE Transactions on Systems, Man, and Cybernetics*, pp. 1210–1217 (Sep./Oct. 1989).

Schwartz et al., "Fuzzy Logic Flowers in Japan," *IEEE Spectrum*, pp. 32–35 (Jul. 1992).

Soucek et al., *Neural and Massively Parallel Computers*, Chapter 12, pp. 245–276 (John Wiley & Sons 1988).

Suaya et al., eds., *VLSI and Parallel Computation*, Chapter 1, pp. 1–84, and Chapter 5, pp. 340–415 (Morgan Kaufmann 1990).

Teuber, *Digital Image Processing*, Chapter 1, pp. 1–30, Chapter 2, pp. 31–70, and Appendix D, pp. 254–255 (Prentice Hall 1993).

Wasserman,*Neural Computing: Theory and Practice*, Chapter 1, pp. 11–26, Chapter 2, pp. 27–42, Chapter 3, pp. 43–59, and Chapter 9, pp. 151–166 (Van Nostrand Reinhold 1989).

Yuhas et al., "Integration of Acoustic and Visual Speech Signals Using Neural Networks," *IEEE Spectrum*, pp. 65–71 (Nov. 1989).

Shekhar et al., Design and Validation of Head up Displays for Navigation in IVHS, *VNIS '91*, Oct. 1991, pp. 537–542.

"NHTSA IVHS Plan," National Highway Safety Administration U.S. Department of Transportation, Jun. 12, 1992.

Bosacchi et al, Fuzzy Logic Technology & the Intelligent Highway System (IHS); *IEEE*, 1993, pp. 65–70.

Rock et al., "Intelligent Road Transit: The Next Generation," *AI Expert*, Apr. 1994, pp. 16–24 (not prior art).

* cited by examiner

FIG. 9

ACCELERATION = LP

| V\D | VL | L | M | H | VH |
|---|---|---|---|---|---|
| VC | Y-LB-N0 | R-LB-S0 | R-MB-S0 | R-HB-M0 | R-HB-M0 |
| C | Y-NB-N0 | Y-LB-N0 | R-MB-S0 | R-HB-S0 | R-HB-M0 |
| M | G-NB-N0 | Y-NB-N0 | Y-LB-N0 | R-MB-N0 | R-HB-S0 |
| F | G-NB-N0 | G-NB-N0 | G-NB-N0 | Y-LB-N0 | Y-LB-N0 |
| VF | G-NB-N0 | G-NB-N0 | G-NB-N0 | G-NB-N0 | Y-LB-N0 |

ACCELERATION = MP

| V\D | VL | L | M | H | VH |
|---|---|---|---|---|---|
| VC | R-MB-N0 | R-MB-S0 | R-HB-M0 | R-HB-H0 | R-HB-H0 |
| C | Y-LB-N0 | R-MB-N0 | R-MB-S0 | R-HB-M0 | R-HB-H0 |
| M | Y-NB-N0 | Y-LB-N0 | R-MB-N0 | R-HB-N0 | R-HB-S0 |
| F | G-NB-N0 | G-NB-N0 | Y-NB-N0 | Y-LB-N0 | R-LB-N0 |
| VF | G-NB-N0 | G-NB-N0 | Y-NB-N0 | Y-LB-N0 | Y-LB-N0 |

ACCELERATION = HP

| V\D | VL | L | M | H | VH |
|---|---|---|---|---|---|
| VC | R-MB-N0 | R-HB-N0 | R-HB-S0 | R-HB-H0 | R-HB-M0 |
| C | R-MB-N0 | R-MB-N0 | R-MB-S0 | R-HB-M0 | R-HB-M0 |
| M | Y-LB-N0 | R-MB-N0 | R-MB-N0 | R-HB-M0 | R-HB-N0 |
| F | Y-NB-N0 | Y-NB-N0 | Y-NB-N0 | R-LB-N0 | R-LB-N0 |
| VF | G-NB-N0 | G-NB-N0 | Y-NB-N0 | Y-NB-N0 | R-MB-N0 |

ACCELERATION = LN

| V\D | VL | L | M | H | VH |
|---|---|---|---|---|---|
| VC | Y-LB-N0 | Y-LB-N0 | R-MB-N0 | R-HB-S0 | R-HB-M0 |
| C | Y-NB-N0 | Y-MB-N0 | Y-MB-N0 | R-HB-N0 | R-HB-S0 |
| M | G-NB-N0 | G-NB-N0 | Y-SB-N0 | R-MB-S0 | R-MB-S0 |
| F | G-NB-N0 | G-NB-N0 | G-NB-N0 | Y-NB-N0 | Y-NB-N0 |
| VF | G-NB-N0 | G-NB-N0 | G-NB-N0 | G-NB-N0 | Y-NB-N0 |

ACCELERATION = MN

| V\D | VL | L | M | H | VH |
|---|---|---|---|---|---|
| VC | Y-LB-N0 | Y-MB-N0 | Y-MB-N0 | R-HB-S0 | R-HB-M0 |
| C | Y-NB-N0 | Y-NB-N0 | Y-LB-N0 | Y-LB-S0 | R-MB-S0 |
| M | G-NB-N0 | G-NB-N0 | Y-MB-N0 | Y-MB-S0 | R-MB-S0 |
| F | G-NB-N0 | G-NB-N0 | G-NB-N0 | Y-NB-N0 | Y-NB-N0 |
| VF | G-NB-N0 | G-NB-N0 | G-NB-N0 | G-NB-N0 | Y-NB-N0 |

ACCELERATION = HN

| V\D | VL | L | M | H | VH |
|---|---|---|---|---|---|
| VC | Y-NB-N0 | Y-LB-N0 | Y-LB-N0 | Y-MB-S0 | R-MB-M0 |
| C | G-NB-N0 | G-NB-N0 | G-NB-N0 | Y-LB-N0 | Y-LB-N0 |
| M | G-NB-N0 | G-NB-N0 | G-NB-N0 | Y-LB-N0 | Y-LB-N0 |
| F | G-NB-N0 | G-NB-N0 | G-NB-N0 | G-NB-N0 | G-NB-N0 |
| VF | G-NB-N0 | G-NB-N0 | G-NB-N0 | G-NB-N0 | G-NB-N0 |

| STATE VECTOR | HAZARD |  |  |  | OBSTACLE |  |  |  |
|---|---|---|---|---|---|---|---|---|
|  | HF | HB | HL | HR | OF | OB | OL | OR |
| 1 | 0 | 0 | 0 | 0 | 0 | 0 | 0 | 0 |
| 2 | 0 | 0 | 0 | 1 | 0 | 0 | 1 | 0 |
| 3 | 0 | 0 | 0 | 1 | 0 | 1 | 0 | 1 |
| 4 | 0 | 0 | 0 | 1 | 0 | 1 | 1 | 0 |
| 5 | 0 | 0 | 0 | 1 | 1 | 0 | 0 | 1 |
| 6 | 0 | 0 | 0 | 1 | 1 | 0 | 1 | 0 |
| 7 | 0 | 0 | 0 | 1 | 1 | 1 | 0 | 1 |
| 8 | 0 | 0 | 0 | 1 | 1 | 1 | 0 | 0 |
| 9 | 0 | 0 | 1 | 0 | 0 | 0 | 0 | 0 |
| 10 | 0 | 0 | 1 | 0 | 0 | 0 | 0 | 1 |
| 11 | 0 | 0 | 1 | 0 | 0 | 1 | 0 | 0 |
| 12 | 0 | 0 | 1 | 0 | 0 | 1 | 0 | 1 |
| 13 | 0 | 0 | 1 | 1 | 0 | 0 | 0 | 0 |
| 14 | 0 | 0 | 1 | 1 | 0 | 1 | 0 | 0 |
| 15 | 0 | 0 | 1 | 1 | 1 | 0 | 0 | 0 |
| 16 | 0 | 0 | 1 | 1 | 1 | 1 | 0 | 0 |
| 17 | 0 | 0 | 1 | 1 | 1 | 1 | 0 | 1 |
| 18 | 0 | 1 | 0 | 0 | 0 | 0 | 0 | 0 |
| 19 | 0 | 1 | 0 | 0 | 0 | 0 | 1 | 0 |
| 20 | 0 | 1 | 0 | 0 | 0 | 1 | 0 | 0 |
| 21 | 0 | 1 | 0 | 0 | 0 | 1 | 1 | 0 |
| 22 | 0 | 1 | 0 | 0 | 1 | 0 | 0 | 0 |
| 23 | 0 | 1 | 0 | 0 | 1 | 0 | 1 | 0 |
| 24 | 0 | 1 | 0 | 0 | 1 | 1 | 0 | 0 |
| 25 | 0 | 1 | 0 | 0 | 1 | 1 | 1 | 0 |
| 26 | 0 | 1 | 0 | 1 | 0 | 0 | 0 | 0 |
| 27 | 0 | 1 | 0 | 1 | 0 | 1 | 0 | 0 |
| 28 | 1 | 0 | 0 | 0 | 0 | 0 | 0 | 0 |
| 29 | 1 | 0 | 0 | 0 | 0 | 0 | 1 | 0 |
| 30 | 1 | 0 | 0 | 0 | 0 | 1 | 0 | 0 |
| 31 | 1 | 0 | 0 | 1 | 0 | 0 | 0 | 0 |
| 32 | 1 | 0 | 0 | 1 | 0 | 1 | 0 | 0 |
| 33 | 1 | 0 | 0 | 1 | 1 | 0 | 0 | 0 |
| 34 | 1 | 0 | 0 | 1 | 1 | 1 | 0 | 0 |
| 35 | 1 | 1 | 0 | 0 | 0 | 0 | 0 | 0 |
| 36 | 1 | 1 | 0 | 0 | 0 | 0 | 0 | 1 |
| 37 | 1 | 1 | 0 | 0 | 0 | 0 | 1 | 0 |
| 38 | 1 | 1 | 0 | 0 | 0 | 0 | 1 | 1 |
| 39 | 1 | 1 | 0 | 0 | 0 | 1 | 0 | 0 |
| 40 | 1 | 1 | 0 | 0 | 0 | 1 | 1 | 0 |
| 41 | 1 | 1 | 0 | 0 | 1 | 0 | 0 | 1 |
| 42 | 1 | 1 | 0 | 0 | 1 | 0 | 1 | 0 |
| 43 | 1 | 1 | 0 | 0 | 1 | 1 | 0 | 1 |
| 44 | 1 | 1 | 0 | 0 | 1 | 1 | 1 | 0 |
| 45 | 1 | 1 | 0 | 1 | 0 | 0 | 0 | 0 |
| 46 | 1 | 1 | 0 | 1 | 0 | 0 | 0 | 1 |
| 47 | 1 | 1 | 0 | 1 | 0 | 1 | 0 | 0 |
| 48 | 1 | 1 | 0 | 1 | 1 | 0 | 0 | 1 |
| 49 | 1 | 1 | 0 | 1 | 1 | 0 | 1 | 0 |
| 50 | 1 | 1 | 0 | 1 | 1 | 1 | 0 | 1 |
| 51 | 1 | 1 | 1 | 0 | 0 | 0 | 0 | 0 |
| 52 | 1 | 1 | 1 | 0 | 0 | 0 | 0 | 1 |
| 53 | 1 | 1 | 1 | 0 | 0 | 1 | 0 | 0 |
| 54 | 1 | 1 | 1 | 0 | 0 | 1 | 0 | 1 |
| 55 | 1 | 1 | 1 | 0 | 1 | 0 | 0 | 0 |
| 56 | 1 | 1 | 1 | 0 | 1 | 0 | 0 | 1 |
| 57 | 1 | 1 | 1 | 0 | 1 | 1 | 0 | 0 |
| 58 | 1 | 1 | 1 | 0 | 1 | 1 | 0 | 1 |
| 59 | 1 | 1 | 1 | 1 | 0 | 0 | 0 | 0 |
| 60 | 1 | 1 | 1 | 1 | 0 | 0 | 1 | 0 |
| 61 | 1 | 1 | 1 | 1 | 0 | 1 | 0 | 0 |
| 62 | 1 | 1 | 1 | 1 | 0 | 1 | 1 | 0 |
| 63 | 1 | 1 | 1 | 1 | 1 | 0 | 0 | 0 |
| 64 | 1 | 1 | 1 | 1 | 1 | 0 | 1 | 0 |
| 65 | 1 | 1 | 1 | 1 | 1 | 1 | 0 | 0 |
| 66 | 1 | 1 | 1 | 1 | 1 | 1 | 0 | 1 |
| 67 | 1 | 1 | 1 | 1 | 1 | 1 | 1 | 0 |
| 68 | 1 | 1 | 1 | 1 | 1 | 1 | 1 | 1 |

FIG. 12

MOTOR VEHICLE WARNING AND CONTROL SYSTEM AND METHOD

CROSS-REFERENCE TO RELATED APPLICATIONS

This application is a continuation of application Ser. No. 08/671,853, filed Jun. 28, 1996, now U.S. Pat. No. 6,553,130 which is a continuation of application Ser. No. 08/105,304, filed Aug. 11, 1993, now abandoned.

FIELD OF THE INVENTION

This invention relates to a system and method for operating a motor vehicle, such as an automobile, truck, aircraft or other vehicle, wherein a computer or computerized system is employed to assist and/or supplement the driver in the movement of the vehicle along a path of travel, such as a street or roadway and may be used to avoid obstacles and accidents.

BACKGROUND OF THE INVENTION

A major cause of human suffering is automobile accidents. Approximately 49,000 people die in traffic accidents each year in the United States, and another three million are injured. The costs of death and injury accidents are staggering. According to the United States National Highway Traffic Safety Administration, crash damage and medical bills total $137 billion a year.

Automobile designers offer many safety features, including passenger restraints, improved braking systems, and body designs, intended to better protect automobile crash victims. But very little has been done in the area of automatic vehicle control systems based on modern electronics, computer systems, and advanced real-time software. This is true despite rapidly increasing capabilities in these technologies and pervasive application in many other areas including, for example the business, entertainment, and medical fields. Vehicle guidance and control technology has, of course, been applied with great success in military defense systems, avionics systems and space exploration systems. But, this technology is costly and has not been commercialized.

The opportunity exists today to develop cost effective, commercial automated vehicle control systems. New advances in low-cost hardware and software technology make implementation feasible. High-speed, parallel computer architectures, specialized image-processing equipment, and advanced special computers such as math co-processors are available. Advanced expert system implementations based on concepts such as fuzzy logic and neural networks, and new, improved scanning systems for sensing environments around moving vehicles make it very timely, indeed, to pursue new approaches.

Work on these problems has begun. Intelligent vehicle/highway systems are being investigated with traffic control systems intended to minimize congestion. Vehicle location systems such as GPS (Global Positioning System) and route guidance systems are also being pursued. Certain systems for automated vehicle control have been proposed, including systems that scan the roadway directly ahead of a vehicle using radar/lidar or television and attempt to warn a driver of impending danger. Fuzzy logic expert systems for controlling vehicle speed (braking and throttle) based on scanning the roadway ahead of a vehicle have been described. Road tracking with electronic vehicle guidance is being pursued. Fuzzy logic has been applied to braking systems in subway and train systems.

While these developments are important, they fail to protect vehicles from many types of collisions or minimize the damage therefrom. More particularly, such systems fail to exercise simultaneous, coordinated control over vehicle steering and speed, fail to take full advantage of identification of different obstacle or hazard types using standard stored models of production vehicles and other commonly encountered roadway objects, fail to deal effectively with objects and hazards located simultaneously on different sides of the vehicle, and fail to capitalize fully on modern expert system decision and control technology, such as represented by fuzzy logic and neural network methods, to deal with more complex hazardous situations.

SUMMARY OF THE INVENTION

In a preferred form of the invention, a video scanning system, such as a television camera and/or one or more laser scanners mounted on the vehicle scan the road in front of the vehicle and generate image information which is computer analyzed per se or in combination with a range sensing system to warn the driver of hazardous conditions during driving by operating a display, such as a heads-up display, and/or a synthetic speech generating means which generates sounds or words of speech to verbally indicate such road conditions ahead of the vehicle.

The preferred form of the invention provides audible and/or visual display means to cooperate in indicating to the driver of a motor vehicle both normal and hazardous road conditions ahead as well as driving variables such as distances to stationary objects, and other vehicles; the identification, direction of travel and speed of such other vehicles and the identification of and distances to stationary or slowly moving objects such as barriers, center islands, pedestrians, parked cars poles, sharp turns in the road and other conditions. In addition, the image analyzing computer of the vehicle may be operated to scan and decode coded and/or character containing signs or signals generated by indicia or code generating other devices within or at the side of the road and indicating select road and driving conditions ahead.

The computer is operable to analyze video and/or other forms of image information generated as the vehicle travels to identify obstacles ahead of the vehicle and, in certain instances, quantify the distance between the vehicle containing same on the basis of the size of the identified vehicle or object and/or by processing received pulse-echo signals. Using such identifying information and comparing it with information on the shapes and sizes of various objects such as rear and front profiles of all production vehicles and the like and their relative sizes or select dimensions thereof, indications of distances to such objects may be computed and indicated as further codes.

When the closing distance becomes hazardous, select vehicle subsystems may be automatically controlled by the computer as it continues to analyze image signals generated by the television camera. A first subsystem generates a first select code or codes which controls an electronic display, such as a heads-up display to cause it to display a warning indication, such as one or more flashing red light portions of the display or other lighted effect. For example, the display may project on the windshield or dashboard such information as images of the controlled vehicle and other vehicles in and adjacent its path of travel and relative distances thereto as well as groups of characters defining same, colored and flashing warning lights and the like for pre-warning and warning purposes. A second subsystem generates a code or series of codes which control a sound generating means which generates a select sound such as a horn, buzzing sound and/or select synthetic speech warning of the hazardous condition detected and, in certain instances, generating sounds of select words of speech which may warn of same and/or suggest corrective action(s) by the vehicle operator or driver to avoid an accident.

A third subsystem comes on-line and generates one or more codes which are applied to at least partly effect a corrective action such as by pulsing one or more motors or solenoids to apply the brakes of the vehicle to cause it to slow down. If necessary to avoid or lessen the effects of an accident, the third subsystem stops the forward travel of the vehicle in a controlled manner depending on the relative speeds of the two vehicles, and/or the controlled vehicle and a stationery object or structure and the distance therebetween.

A fourth subsystem, which maybe part of or separate from the third subsystem may generate one or more codes which are applied to either effect partial and/or complete control of the steering mechanism for the vehicle to avoid an obstacle and/or lessen the effect of an accident. Either or both the third or fourth subsystem may also be operable to control one or more safety devices by controlling motors, solenoids or valves, to operate a restraining device or devices for the driver and passenger(s) of the vehicle, such as a safety belt tightening means, an air bag inflation means or other device designed to protect human beings in the vehicle.

The second, and/or third and fourth subsystems may also be operable to effect or control the operations of additional warning means such as the horn, headlights and/or other warning lights on the vehicle or other warning means which operates to alert, flag or warn the driver of the approaching or approached vehicle or a pedestrian of the approaching hazardous condition. One or more of these subsystems may also be operable to generate and transmit one or more codes to be received and used by the approaching or approached vehicle or a roadside device to effect additional on-line warning(s) of the hazardous condition, and/or may be recorded on a disc or RAM (random access memory) for future analysis, if necessary.

In a modified form of the invention, the vehicle warning system may also include a short wave receiving means to receive code signals from other vehicles and/or short wave transmitters at the side of or within the road for controlling the visual, audio and/or brake and steering means of the vehicle to avoid or lessen the effects of an accident and/or to maintain the vehicle in-lane and in proper operating condition as it travels.

The systems and methods of this invention preferably employ computerized image analyzing techniques of the types disclosed and defined in such patents of mine as U.S. Pat. Nos. 4,969,038 and 4,979,029 and references cited in the file wrappers thereof as well as other more recent patents and include the use of known artificial intelligence, neural networking and fuzzy logic computing electronic circuits.

While the invention is described herein principally in connection with an automobile on a roadway, it may be used in connection with controlling any powered vehicle, including a motor vehicle, a boat, a train, or an aircraft.

Accordingly it is a primary object of this invention to provide a new and improved system and method for controlling the operation of a powered vehicle.

Another object is provide a system and method for assisting the driver of a powered vehicle in controlling its operation to avoid an accident or hazardous driving condition.

Another object is to provide a system and method employing computerized image analysis to control or assist the driver of a motor vehicle in controlling its operation to avoid hazardous conditions such as collisions with other vehicles, stationery objects or pedestrians.

Another object is to provide a computerized system and method for controlling the speed of travel of a motor vehicle to lessen the chances of an accident while being driven by a person.

Another object is to provide a system and method employing a television scanning camera mounted on a vehicle for scanning the field ahead, such as the image of the road ahead of the vehicle and a computer for analyzing the image signals generated wherein automatic image intensifying, or infra-red scanning and detection means is utilized to permit scanning operations to be effected during driving at night and in low light, snowing or fog conditions.

Another object is to provide a system and method employing a television camera or other video scanning means mounted on a moving motor vehicle for scanning, detecting and identifying obstacles such as other vehicles ahead of such moving vehicle wherein the video image signals are analyzed to determine distances to such objects.

Another object is to provide a computer controlled safety system for a motor vehicle which employs a television camera and an auxiliary scanning means to both identify obstacles in the path of the vehicle and determine distance therefrom on a real time and continuous basis for use in warning the operator of same and/or in controlling the operation of the vehicle to avoid a collision.

BRIEF DESCRIPTION OF DRAWINGS

The various hardware and software elements used to carry out the invention described herein are illustrated in the form of block diagrams, flow charts, and depictions of neural network and fuzzy logic algorithms and structures. The preferred embodiment is illustrated in the following figures:

FIG. 9 illustrates typical Fuzzy Associative Memory (FAM) maps for the fuzzy logic algorithms useful in the Motor Vehicle Warning and Control System of FIG. 1.

FIG. 12 is a table of Hazard/Object state vectors indicating possible combinations of hazards and objects useful in the Fuzzy Associative Memory access system used herein.

DETAILED DESCRIPTION

Figure 1:
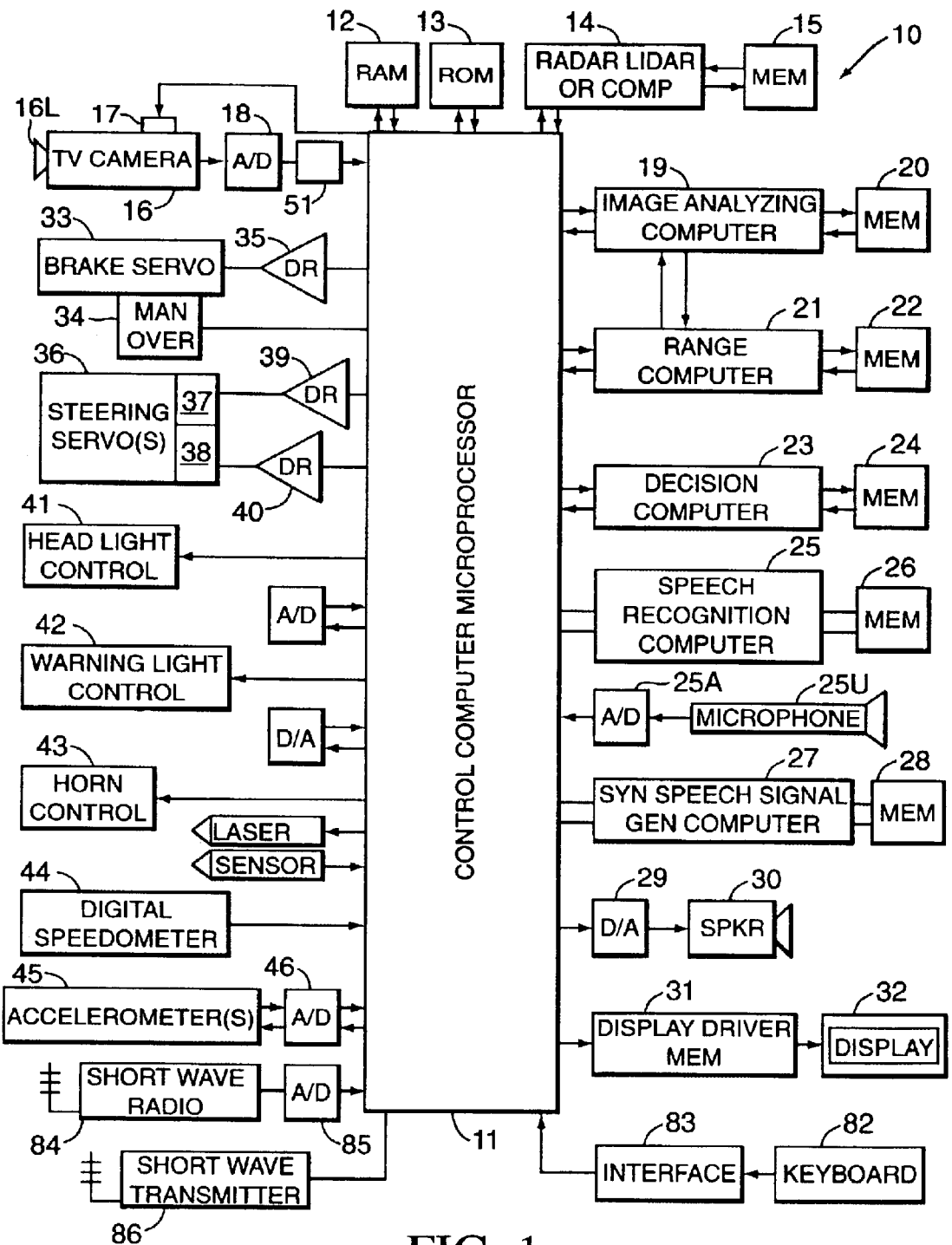
FIG. 1 is a block diagram of the overall Motor Vehicle Warning and Control System illustrating system sensors, computers, displays, input/output devices and other key elements.

In FIG. 1 is shown a computerized control system 10 for controlling the operation of a motor vehicle to prevent or lessen the effects of accidents such as collisions with stationery and/or moving objects such as other vehicles. The system 10 employs a control computer or microprocessor 11 mounted on the vehicle and operable to receive and gate digital signals, such as codes and control signals from various sensors, to one or more specialized computers and from such computers to a number of servos such as electric motors and lineal actuators or solenoids, switches and the like, speakers and display drivers to perform either or both the functions of audibly and/or visually informing or warning the driver of the vehicle of a hazardous road condition ahead and/or to effect controlled braking and steering actions of the vehicle.

A RAM 12 and ROM 13 are connected to processor 11 to effect and facilitate its operation. A television camera(s) 16 having a wide angle lens 16L is mounted at the front of the vehicle such as the front end of the roof, bumper or end of the hood to scan the road ahead of the vehicle at an angle encompassing the sides of the road and intersecting roads. The analog signal output of camera 16 is digitized in an A/D convertor 18 and passed directly to or through a video preprocessor 51 to microprocessor 11, to an image field analyzing computer 19 which is provided, implemented and programmed using neural networks and artificial intelligence as well as fuzzy logic algorithms to (a) identify objects on the road ahead such as other vehicles, pedestrians, barriers and dividers, turns in the road, signs and symbols, etc., and generate identification codes, and (b) detect distances from such objects by their size (and shape) and provide codes indicating same for use by a decision computer, 23, which generates coded control signals which are applied through the computer 11 or are directly passed to various warning and vehicle operating devices such as a braking computer or drive, 35, which operates a brake servo 33, a steering computer or drive(s) 39 and 40 which operate steering servos 36; a synthetic speech signal generator 27 which sends trains of indicating and warning digital speech signals to a digital-analog converter 29 connected to a speaker 30; a display driver 31 which drives a (heads-up or dashboard) display 32; a headlight controller 41 for flashing the headlights, a warning light control 42 for flashing external and/or internal warning lights; a horn control 43, etc.

A digital speedometer 44 and accelerometer(s) 45 provide information signals for use by the decision computer, 23, in issuing its commands. Accelerometer(s) 45 are connected to control computer microprocessor 11 through analog-to-digital converter 46. The accelerometer(s) 45 may pass data continuously to control computer microprocessor 11, or, alternatively, respond to query signals from said control computer 11. An auxiliary range detection means comprises a range computer 21 which accepts digital code signals from a radar or lidar computer 14 which interprets radar and/or laser range signals from respective reflected radiation receiving means on the vehicle. In a modified form, video scanning and radar or lidar scanning may be jointly employed to identify and indicate distances between the controlled vehicle and objects ahead of, to the side(s) of, and to the rear of the controlled vehicle.

The image analyzing computer 19 with associated memory 20 may be implemented in several different ways. Of particular concern is the requirement for high speed image processing with the capability to detect various hazards in dynamic image fields with changing scenes, moving objects and multiple objects, more than one of which maybe a potential hazard. Requirements for wide angle vision and the ability to analyze both right and left side image fields also exist. The imaging system not only detects hazards, but also estimates distance based on image data for input to the range computer 21 implemented with the associated memory unit 22.

Figure 2:
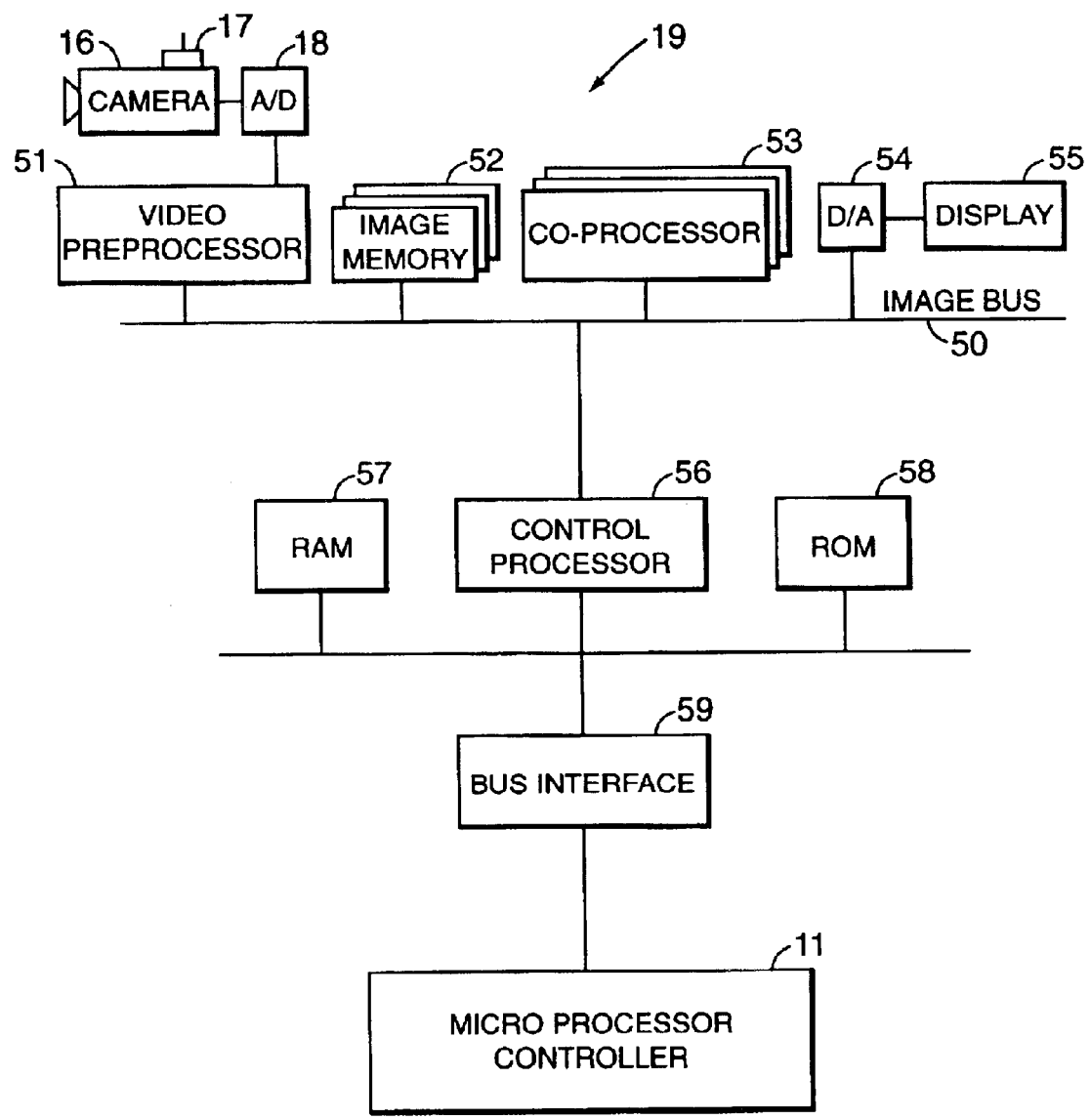
FIG. 2 is a block diagram of an image analysis computer 19 of the type that can be used in the Vehicle Hazard Avoidance System herein of FIG. 1.

High speed image processing can be implemented employing known special purpose computer architectures including various parallel system structures and systems based on neural networks. FIG. 2 shows a high speed parallel processor system embodiment with dedicated image processing hardware. The system of FIG. 2 has a dedicated image data bus 50 for high speed image data transfer. The video camera 16 transfers full-frame video picture signal/data to the image bus 50 via analog/digital converter 18 and video preprocessor 51. The video camera 16 is preferably a CCD array camera generating successive picture frames with individual pixels being digitized for processing by the video preprocessor 51. The video camera 16 may also be implemented with other technologies including known image intensifying electron gun and infra-red imaging methods. Multiple cameras may be used for front, side and rear viewing and for stereo imaging capabilities suitable for generation of three-dimensional image information including capabilities for depth perception and placing multiple objects in three dimensional image fields to further improve hazard detection capabilities.

As shown in FIG. 2, the video preprocessor 51 performs necessary video image frame management and data manipulation in preparation for image analysis. The preprocessor 51 may also be used in some embodiments for digital prefiltering and image enhancement. Actual image data can be displayed in real time using video display 55 via analog-to-digital converter 54. The image display may include highlighting of hazards, special warning images such as flashing lights, alpha-numeric messages, distance values, speed indicators and other hazard and safety related messages. Simulated displays of symbols representing the hazard objects as well as actual video displays may also be used to enhance driver recognition of dangerous situations.

The image analysis computer 19 operates under the control of control processor 56 with random-access-memory (RAM) 57 and program and reference data stored in read-only memory (ROM) 58. The control processor 56 communicates with the motor vehicle warning and control system micro-processor controller 11 through the Bus Interface Unit 59. Results of the image analysis are passed in real-time to microprocessor controller 11 for integration with other sensory, computing, warning and control signals as depicted in FIG. 1.

The image analysis computer 19 of FIG. 2 uses high speed dedicated co-processor 53 for actual image analysis under control of the control processor 56. Typical operations performed using co-processors 53 include multidimensional filtering for operations such as feature extraction and motion detection. The co-processors 53 are used for multidimensional discrete transforms and other digital filtering operations used in image analysis. Multiple image memories 52 with parallel access to successive image data frames via image bus 50 permit concurrent processing with high speed data access by respective co-processing elements 53. The co-processor elements 53 may be high speed programmable processors or special purpose hardware processors specifically constructed for image analysis operations. SIMD (single instruction, multiple data) architectures provide high speed operation with multiple identical processing elements under control of a control unit that broadcasts instructions to all processing elements. The same instruction is executed simultaneously on different data elements making this approach particularly well suited for matrix and vector operations commonly employed in image analysis operations. Parallel operations of this type are particularly important with high pixel counts. A 1000×1000 pixel image has one million data points. Tightly coupled Multiple Instruction, Multiple Data (MIMD) architectures also are used in image processing applications. MIMD systems execute independent but related programs concurrently on multiple processing elements. Various array processor and massively parallel architectures known to those skilled in the art may also be used for real-time image analysis.

The calculation of the distance of certain recognizable objects from the vehicle is facilitated by having standard images stored in memory and recalling and comparing such image data with image data representing the object detected by the vehicle scanning mechanisms. For example, virtually all automobiles, trucks, and other standard vehicles have known widths. It follows that the distance to a second powered vehicle such as an automobile or truck can be determined by calculating its width in the scanned image. If a CCD camera is used, for example, the width can ascertained in pixels in the image field. The distance to the vehicle can then be easily calculated using a simple relationship wherein the distance will be directly proportional to the object image width in pixels. The relative velocities and accelerations can also be easily calculated from respective first and second derivatives of the image width with respect to time. These image measurements and calculations can be used in addition to radar/lidar signal measurements or they may be used alone depending on system requirements.

Figure 3:
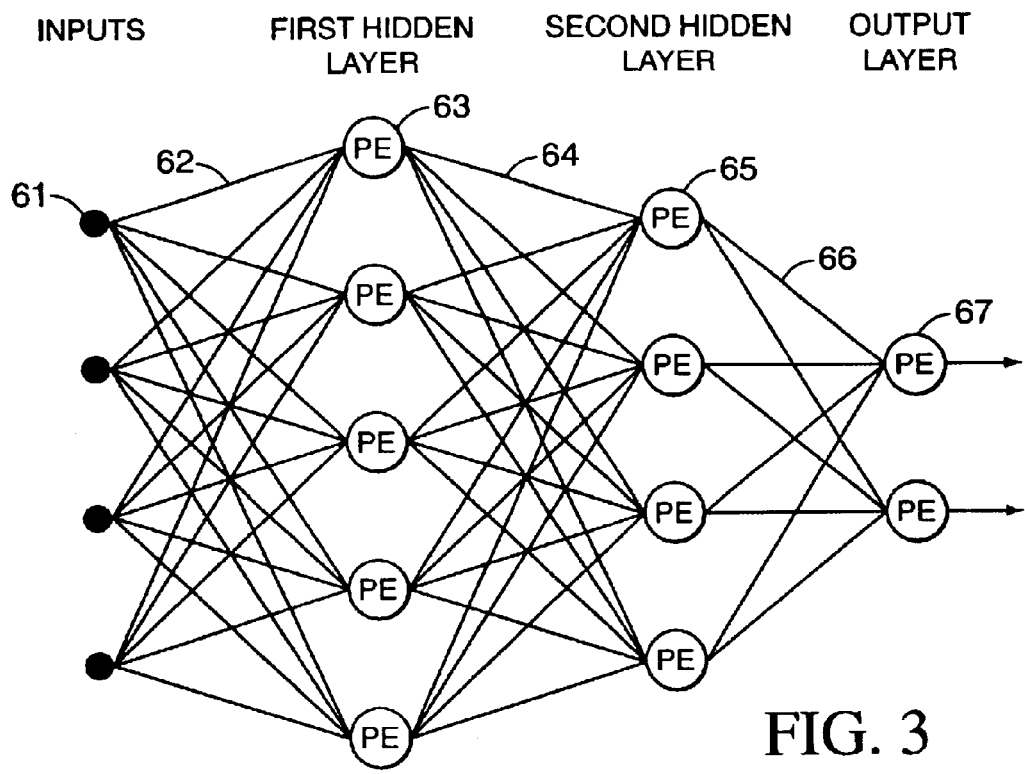
FIG. 3 illustrates a neural network of the type useful in the image analysis computer of FIG. 4.

In another embodiment, the image analyzing computer 19 is implemented as a neural computing network with networked processing elements performing successive computations on input image structure as shown in FIG. 3 where signal inputs 61 are connected to multiple processing elements 63, 65 and 67 through the network connections 62, 64 and 66. The processing elements (PE's) 63, 65 and 67 map input signal vectors to the output decision layer, performing such tasks as image recognition and image parameter analysis.

Figure 4:
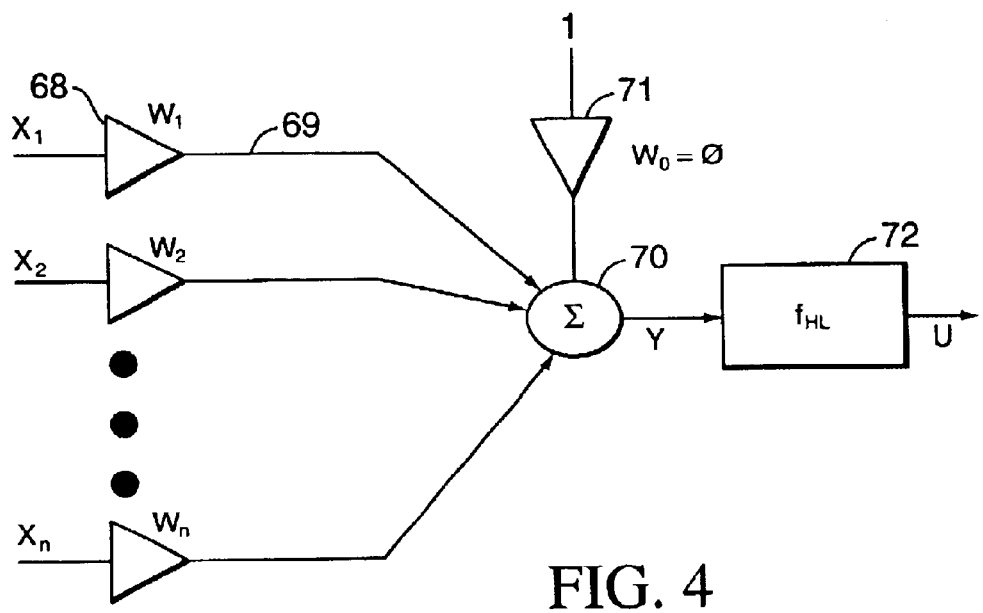
FIG. 4 illustrates the structure of a Processing Element (PE) in the neural network of FIG. 3.

A typical neural network processing element known to those skilled in the art is shown in FIG. 4 where input vectors (X1, X2 . . . Xn) are connected via weighting elements (W1, W2 . . . Wn) to a summing node 70. The output of node 70 is passed through a nonlinear processing element 72 to produce an output signal, U. Offset or bias inputs can be added to the inputs through weighing circuit Wo. The output signal from summing node 70 is passed through the nonlinear element 72. The nonlinear function is preferably a continuous, differentiable function such as a sigmoid which is typically used in neural network processing element nodes. Neural networks used in the vehicle warning system are trained to recognize roadway hazards which the vehicle is approaching including automobiles, trucks, and pedestrians. Training involves providing known inputs to the network resulting in desired output responses. The weights are automatically adjusted based on error signal measurements until the desired outputs are generated. Various learning algorithms may be applied. Adaptive operation is also possible with on-line adjustment of network weights to meet imaging requirements. The neural network embodiment of the image analysis computer 19 provides a highly parallel image processing structure with rapid, real-time image recognition necessary for the Motor Vehicle Warning and Control System. Very Large Scale Integrated (VLSI) Circuit implementation of the neural processing elements permits low-cost, low-weight implementation. Also, a neural network has certain reliability advantages important in a safety warning system. Loss of one processing element does not necessarily result in a processing system failure.

Figure 5:
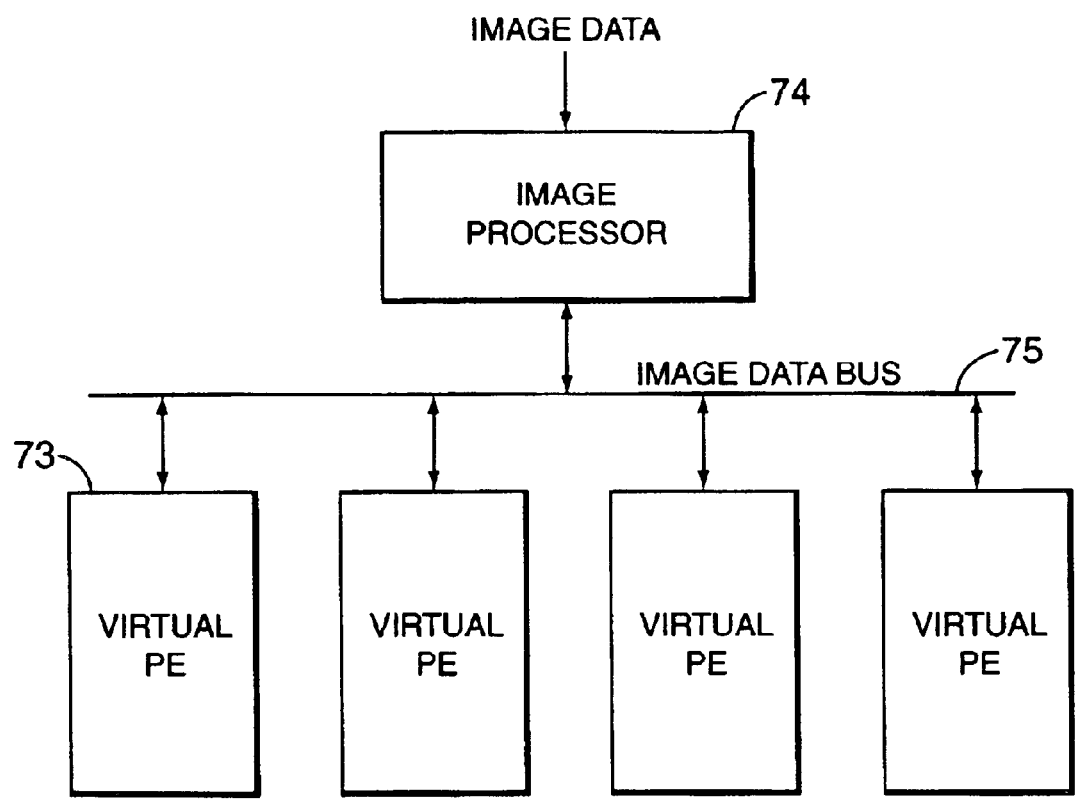
FIG. 5 is an alternate embodiment of a neural network image processor useful in the system of FIG. 1.

In a alternate embodiment, the neural network computing network of FIG. 3 can be implemented using multiple virtual processing elements 73 interconnected via an image data bus 75 with an image processor 74 as shown in FIG. 5. Image data presented to the Image Processor 74 is routed to selected virtual processing elements 73 which implement the neural network computing functions. The virtual PE's may be pipelined processors to increase speed and computational efficiency.

The decision computer 23 of FIG. 1 integrates the inputs from the image analysis computer 19, range computer 21, digital accelerometer 45, and the radar or lidar computer 14 to generate output warning and control signals. Warning signals alert the driver of impending hazards and, depending on the situation, actual vehicle control signals may be generated to operate the vehicle in a manner that will avoid the hazard or minimize the danger to the vehicle and passengers. Control signals will be generated to operate brake servos 33 and steering servos 36. Manual overrides are provided to ensure driver vehicle control if necessary.

A particularly attractive embodiment of the decision computer 23 makes use of fuzzy logic algorithmic structures to implement the automated control and warning signal generation. Fuzzy logic is particularly well suited to the vehicle control problem wherein it is necessary to deal with a multiplicity of image, motion, and environmental parameters, each of which may extend over ranges of values and in different combinations which require different responses.

Figure 6:
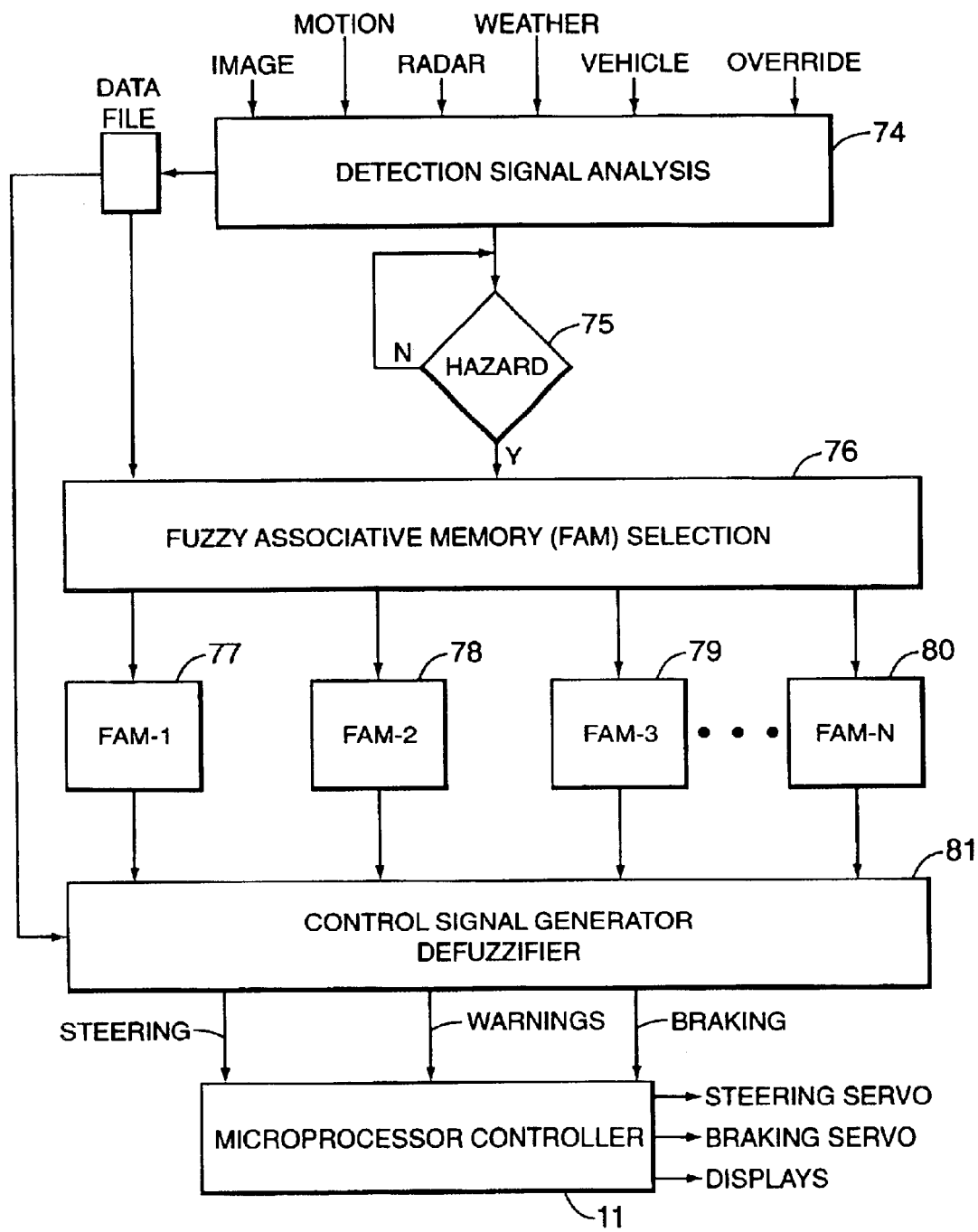
FIG. 6 is a flow diagram illustrating the overall operation of the Motor Vehicle Warning and Control System of FIG. 1.

FIG. 6 illustrates a flow diagram for implementing a Fuzzy Logic Vehicle Control and Warning signal generation system suitable for the decision computer 23. The system of FIG. 6 receives inputs via the control computer microprocessor 11 of FIG. 1. Inputs include image analysis outputs, motion sensor outputs, distance measurements from radar/lidar systems, and environmental parameters which may indicate adverse driving conditions including rain or ice. The input signals are analyzed in a preprocessing step for hazardous conditions in the processing block 74. When a hazard is detected, the Fuzzy Associative Memory (FAM) block 76 described in more detail below is activated via decision element 75. If no hazard is present, the system continues to analyze scanning signals until a hazardous situation is encountered.

The Fuzzy Associative Memory (FAM) block 76 also receives a parameter input file from the Detection Signal Analysis block 74. This file contains necessary information to make control decision including, for example, hazard location (front, back, left side, right side), hazard distance, relative velocity, steering angle, braking pressure, weather data, and the presence or absence of obstructions or objects to the front, rear, or to either side of the vehicle.

Control signals are derived using FAM's 77, 78, 79 and 80. In practice, a large number of FAM's may be used to reflect different possible driving conditions and hazard scenarios. Each Fuzzy Associative Memory maps input control parameter combinations to appropriate output control signals. The output signals are defuzzified in the control signal generator 81 for input to the microprocessor controller 11 of FIG. 1. This controller in turn generates control signals for steering servos, braking servos, and display and warning signals.

Figure 7:
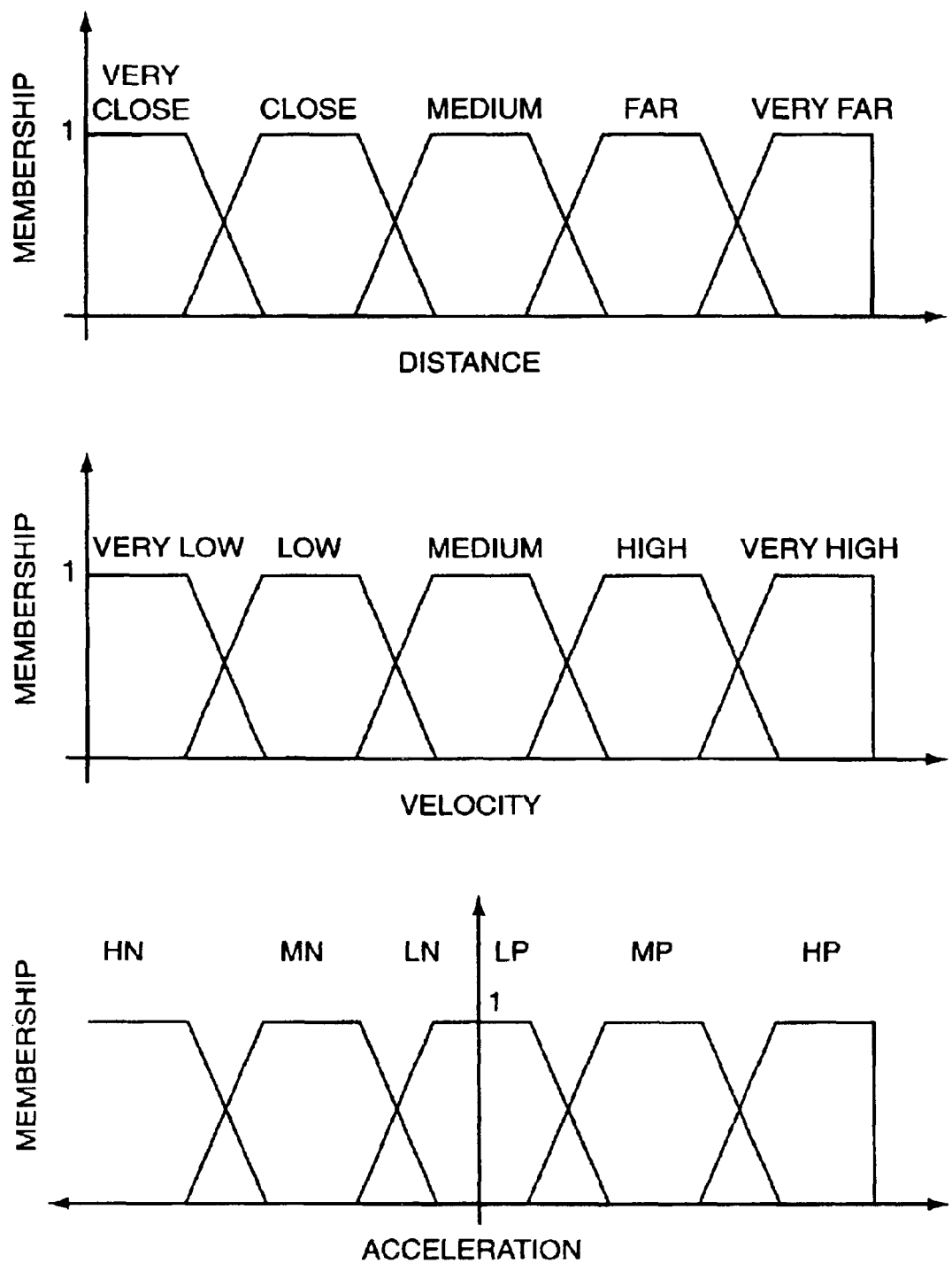
FIG. 7 illustrates typical input signal membership functions for fuzzy logic algorithms useful in the Motor Vehicle Warning and Control System of FIG. 1.

The FAM's operate with input signals measuring, for example, distance to the hazard, relative velocity of the vehicle relative to the hazard and relative acceleration between the vehicle and the hazard. Membership functions for these three variables are shown in FIG. 7. The distance variable is classified as being Very Close (VC), Close (C), Medium (M), Far (F) or Very Far (VF). Overlap between membership in the various grades is indicated by the overlapping trapezoids of FIG. 7. Certain distances are in more than one membership grade, being, for example, on the high end of being very close and the low end of being close.

Similarly, the membership functions for relative velocity grades inputs as Very Low (VL), Low (L), Medium (M), High (H) and Very High (VH) with overlap of membership grades indicated by the intersection of membership grade trapezoids. Relative acceleration is graded as being either positive or negative. Deceleration of the vehicle's velocity relative to the hazard is classified as negative acceleration. Bother positive and negative acceleration are classified as being Low (L), Medium (M) or High (H). Overlapping "fuzzy" membership is indicated with the overlapping trapezoids, permitting possible membership in multiple grades. For example, a particular velocity might have a degree of membership in grade "Low" of 0.2 and a degree of membership in grade "Medium" of 0.6.

Figure 8:
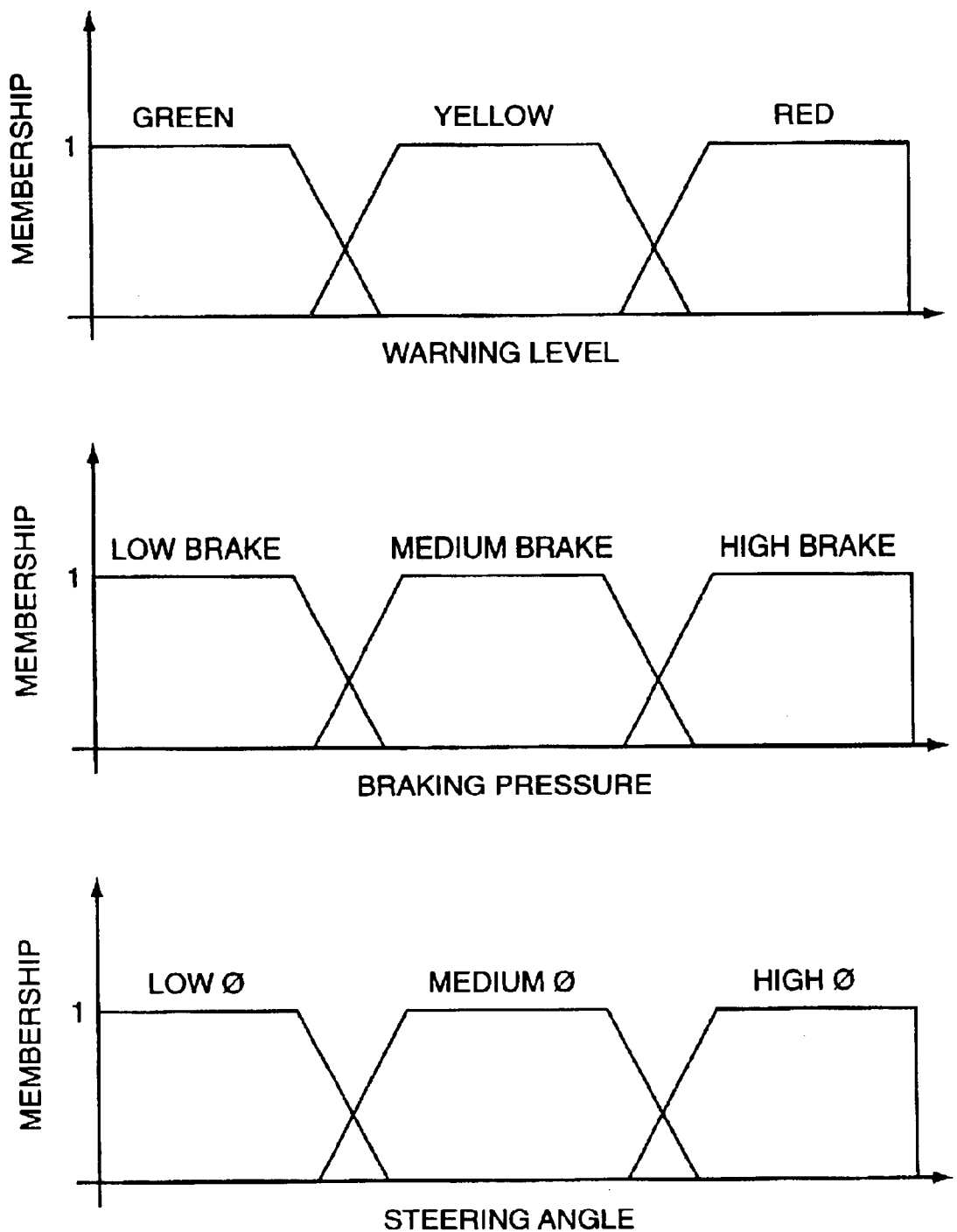
FIG. 8 illustrates typical output signal membership functions for fuzzy logic algorithms useful in the Motor Vehicle Warning and Control System of FIG. 1.

Three outputs are generated from the Fuzzy Associative Memory or FAM bank: (1) Warning Level; (2) Braking Pressure and (3) Steering Angle. The fuzzy output membership functions for these signals are shown in FIG. 8. Three trapezoidal membership functions used for Braking Pressure: (1) Low Brake (LB), (2) Medium Brake (MB), and (3) High Brake (HB). Similarly, the Steering Angle is graded as Low Angle (LØ), Medium Angle (MØ), or High Angle (HØ). Steering will be right or left depending on side obstructions, vehicles, or other conditions as indicated by the detection signal analysis block 74 of FIG. 6. The warning level is indicated as being green, yellow, or red, depending on the danger level presented by the detected hazard. Continuous or discrete warnings can be generated on the output. Possibilities include visual light indicators of different intensity, continuously variable audible alarms, continuously variable color indicators, or other arrangements with possible combinations of visible and audible alarms. Warning indicators can be combined with actual video displays of vehicle situations including hazards and nearby objects. The synthetic speech signal generator 27 of FIG. 1 may be used to generate synthetic speech signals defining spoken alarm warnings.

FIG. 9 depicts a typical FAM for generating the output control signals from the input signals. Each FAM is segmented in six sections depending on the membership grade of the acceleration variable. Interpretation of the FAM logic rules is straightforward. For example, if the relative acceleration is High Positive (HP), the distance is Close (C), and the relative velocity is Medium (M), then the rule stated in the FAM requires grading the warning as Red (R), the Brakes as Medium (MB), and the steering as Small Angle (SØ). As a logic statement or premise, this becomes:

If Acceleration is High Positive (HP), Distance is Close (C), and Velocity is Medium (M), then Warning equals Red (R), Braking equals Medium (M) and Steering Angle equals Small Angle (SØ).

As another example:

If Acceleration is Low Negative (LN), Distance is Medium (M) and Velocity is Very High (VH), then Warning equals Red, Braking equals Medium (MB), and Steering Angle equals Small Angle (SØ).

Each premise has multiple control variables, each with possibly different degrees of membership. Using fuzzy logic principles, the minimum of the truth expression for each variable can be taken as the truth level of the premise. For example, if the membership grade for accelerator High Positive (HP) is 0.6, for Distance Close (C) is 0.45, and for velocity medium (M) is 0.8, then the truth level for the Warning Red (R), Braking Medium (M) and Steering Angle Small (SØ) will be 0.45.

With overlapping fuzzy membership grades, more than one FAM will typically fire in response to a given set of values for the input control variables. Each FAM that fires will yield a particular set of truth value premises for each output variable. The result may include multiple output memberships with different truth values. For example, it may happen that two braking memberships result, such as Low Braking with a truth value of 0.2 and Medium Braking with a truth value of 0.6. The corresponding overlapping membership functions can be defuzzified using these values by known techniques such as the centroid method.

The FAM of FIG. 9 specifies 150 such fuzzy logic rules. Warning Levels, Braking Pressure, and Steering Angle become higher as the danger from the impending hazard increases. Additional FAM entries, not shown, are used to compensate for different driving conditions. For example, a different set of rules is used for inclement weather such as encountered with rain, ice or snow. Also, if side obstructions prevent steering adjustments, different braking scenarios are necessary. Another set of FAM logic rules is also necessary in the event of a hazard to the rear of the vehicle, simultaneous front and rear hazards, or hazards approaching from the right or left side. Such extensions to the teachings presented herein are described below and expand the situations for which the warning system offers protection in avoiding or minimizing the effect of a collision.

The control signal generator 81 of FIG. 6 serves to defuzzify the outputs from the Fuzzy Associative Memory. The defuzzification process converts the output fuzzy sets into particular values that can be used to exercise appropriate control. Various algorithms can be used to defuzzify the output including using the maximum indicated output value in the selected membership class or the centroid method which provides output signals based on center of gravity calculations depending on the range of outputs indicated by the different input variables.

An important attribute of the system is the driver override feature indicated by the override input to the detection signal analysis. The driver override permits the driver to take control at any time by manually braking or steering the vehicle. In practice, then, the automated system will first warn the driver and then provide immediate automatic corrective action if necessary. The automatic system may operate to control the operation of the vehicle if the driver does not properly or quickly enough respond to indication by the warning/indicating device controlled by the system that obstacles are in the path of travel of the vehicle. If the warning gains the driver's attention, the driver may then regain control with the override feature and operate the vehicle to avoid the hazard. Thus the automatic system will normally only apply initial corrective action with the driver then taking control. Of course, if the driver fails to take over, the automated system will continue to operate the vehicle to avoid or minimize the danger presented by the hazard. While manual override is provided, the decision computer may be set to prevent the operation of same if it determines that a collision may occur if the driver operates the manual override.

Figure 10:
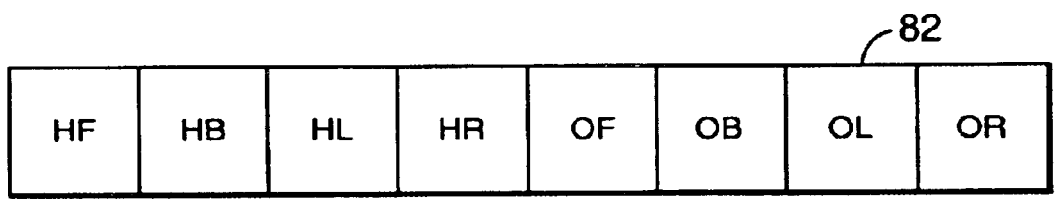
FIG. 10 is a Hazard/Object state vector useful in implementing the Fuzzy Logic Vehicle Warning and Control System.

FIG. 10 shows a Hazard/Object state vector used in control of the Motor Vehicle Warning and Control System herein described. Each state vector has eight bits and represents a particular row of the possible state vectors of FIG. 12. Hazards and obstacles may occur to the front (HF), back (HB), left side (HL) or right side (HR) of the vehicle. For purpose of this discussion, a hazard is a potentially dangerous object such as another vehicle, post, pedestrian or other obstacle when the relative motion of the vehicle under control and the hazard could lead to a collision. An obstacle is an object to the front, rear, right side or left side of the vehicle that might become a hazard depending on the evasive action taken by the vehicle control system to avoid a hazard. A zero ("0") indicates no hazard or obstacle, a one ("1") indicates the presence of a hazard or obstacle. As indicated in the state vector, multiple hazards and/or obstacles may be present.

Figure 11:
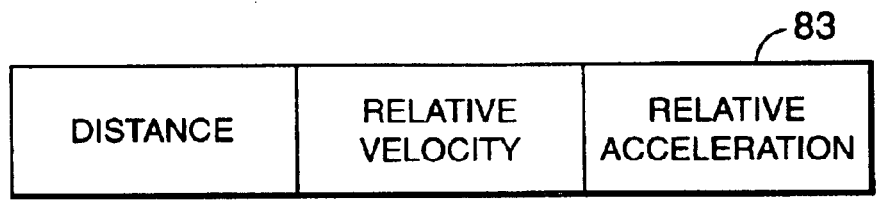
FIG. 11 is a Hazard Collision Control vector useful in implementing the Fuzzy Logic Vehicle Warning and Control System.

FIG. 11 is a Hazard Collision vector. This vector has three fields indicating respectively distance between the vehicle and a particular hazard, relative velocity between the vehicle and a particular hazard, and relative acceleration between the vehicle and a particular hazard. This vector is calculated for hazards detected by the image analysis computer 19 of FIG. 1 and various other sensors including radar/lidar sensors 14 in FIG. 1. The data in the Hazard Collision Vector is used to rank hazard dangers when more than one hazard is simultaneously detected, and also as input to the Fuzzy Logic decision system implemented in decision computer 23 and described below.

FIG. 12 is a table listing various possible combinations of hazards and obstacles that may be encountered by the Motor Vehicle Warning and Control System herein described. Each row is a possible state vector of type shown in FIG. 10. For example, state vector number 44 corresponds to a situation where there is a hazard in front of the vehicle and obstacles to the left and right of the vehicle. Thus, in this situation, it is dangerous to steer the car to the left or right to avoid the hazard. Appropriate avoidance action is this case is to slow the car to minimize the possibility of a collision with the vehicle directly in front of the controlled vehicle.

As another example from the table of FIG. 12, in state vector number 11, the hazard is to the left of the controlled vehicle. In this case, the hazard may be an approaching vehicle from the side wherein the relative motion of the two vehicles will, if not corrected, result in a collision. The controlled vehicle is clear of obstacles to the front and back but may not turn to the right because of a potentially hazardous obstacle located there.

The state vectors of FIG. 12 are determined by the Detection Signal Analysis block 74 of FIG. 6. The state vectors of FIG. 12 become part of the data file passed to the Fuzzy Associative Memory (FAM) selection block 76 of FIG. 6 and to the Control Signal Generator Defuzzifier 81 of FIG. 6.

Figure 13:
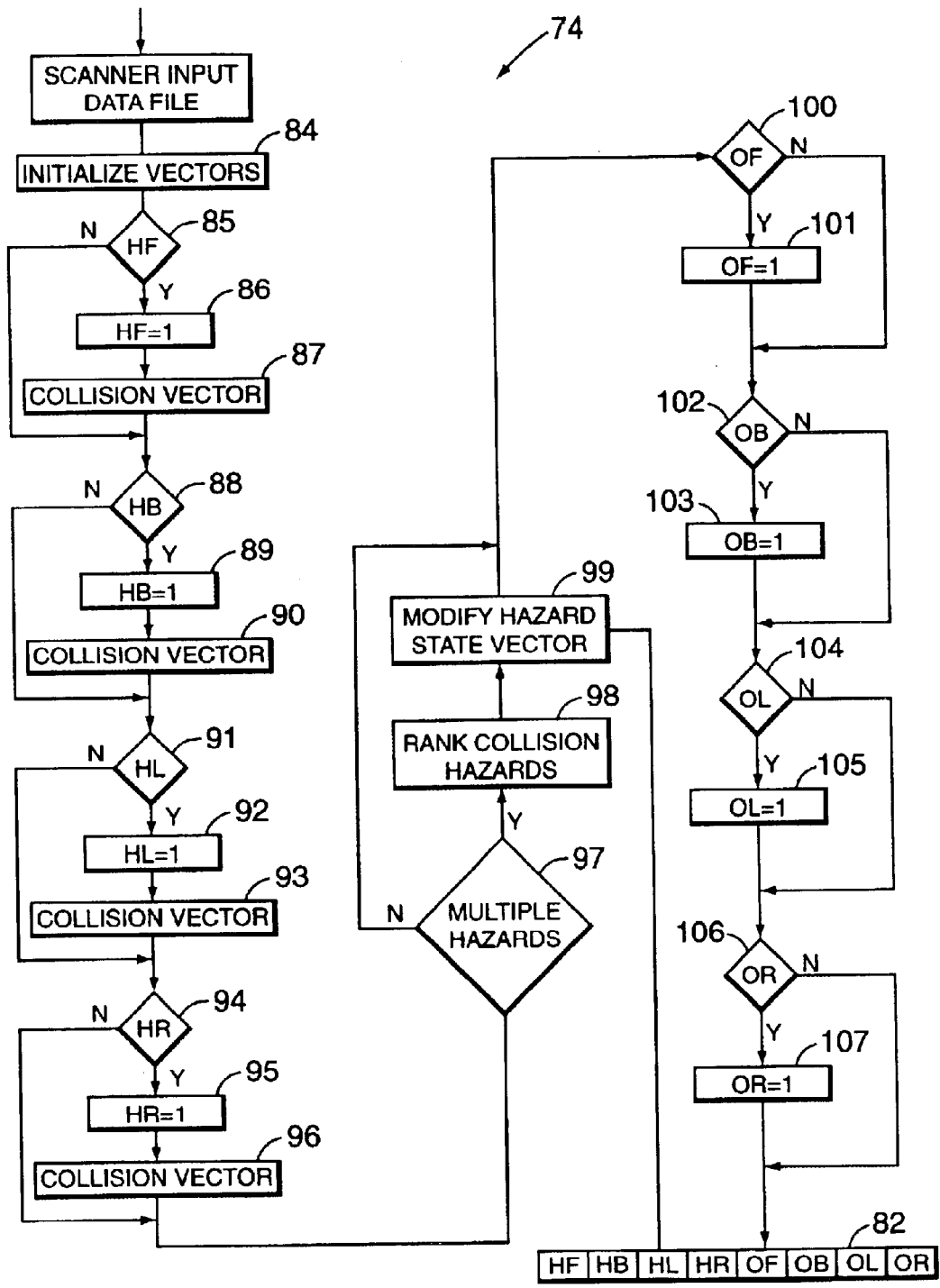
FIG. 13 is a more detailed logic flow diagram for the analysis of detection signals prior to accessing fuzzy logic control structures in the Motor Vehicle Warning and Control System.

FIG. 13 is more detailed drawing of the Detection Signal Analysis Block 74 of the Flow Diagram shown in FIG. 6. The more detailed flow diagram of FIG. 13 is used to set the variables in the state vector of FIG. 10 and to enter parameter values in Hazard Collision vector of FIG. 11. As shown in FIGS. 6 and 13, the Detection Signal Analysis Block 74 receives a Sensor Input Data File from the multiple image, motion and environment sensors of FIG. 1. This data file is used to evaluate potential hazards and set the various control parameters needed in the Hazard/Object state vector 82 and in the Hazard Collision vector 83 of FIGS. 10 and 11 respectively.

The process flow diagram of FIG. 13 first initializes the Hazard/Object state vector 82 and the Hazard Collision vector 83 in block 84, placing zeros in all control fields. Initial calculations are also made in this block using data from the sensor input data file to evaluate potential hazards and identify objects or obstacles to the control system for alerting the driver and, if necessary, exercising direct control over the operation of the vehicle.

Using this information, successive bits are set in the Hazard/Object state vector as indicated in FIG. 13. Decision element 85 will cause the "HF" bit of the Hazard/Object state vector to be set to "1" in block 86 if a hazard is found in the front of the vehicle. Block 87 then calculates the Hazard Collision vector corresponding to the frontal hazard, for entering into the Hazard Collision Vector 83 of FIG. 11. Block 11 formats those data for use in the fuzzy logic vehicle control algorithm hereinabove described providing numerical values for distance, relative velocity, and relative acceleration between the controlled vehicle and the frontal hazard. These numerical values are used later in the control algorithm to rank collision hazards in the event multiple, simultaneous hazards are detected and the control system is called upon to alert the driver and possibly control the vehicle to minimize collision impacts while dealing with multiple dangerous situations.

If no frontal hazard is detected, the flow diagram of FIG. 13 branches around the frontal Hazard/Object state vector operation 86 and frontal Hazard Collision vector operation 87. Whether or not a frontal hazard is present, the flow continues to the rear hazard decision element 88 in FIG. 13. The operation here is basically identical to that described above for the frontal hazard calculation. If a hazard exists in back of the vehicle, the "HB" bit is set to logic "1" in block 89 and the corresponding Hazard Collision vector is calculated and formatted as described above for the frontal hazard situation in block 90. If no hazard exits to the rear, the blocks 89 and 90 are branched around as indicated in FIG. 13.

The same procedure is followed for hazards to the left and right of vehicle in blocks 91 through 96 of FIG. 13. In this way, the flow from block 85 through 96 of FIG. 13 will set all of the hazard control bits of the state vector 82 of FIG. 10 and provide necessary control parameters for the Hazard Collision vector 83 of FIG. 11 for each hazard detected by the system.

If more than one of the bits, HF, HB, HL or HR are set in the blocks 85 to 96 of FIG. 13, multiple hazards exist representing a very dangerous situation for the vehicle. The existence of multiple hazards is indicated by decision element 97 based on the values of HF, HB, HL and HR in blocks 85 to 96 of FIG. 13. If multiple hazards do exist, it is necessary to evaluate and rank each detected hazard so that the most effective avoidance strategy can be adopted. The detailed collision hazards are analyzed and ranked in block 98 of FIG. 13. Hazard ranking is achieved from the respective collision vectors of the indicated hazards as calculated in blocks 87, 90, 93 or 96. As discussed above, the parameter values in these blocks indicate numerical values for distance, relative velocities and relative accelerations. Using these parameters, the time to collision can be calculated for each detected hazard using well known kinematic equations. The most dangerous hazard then can be determined and control signals generated accordingly.

While time to collision is an important control parameter for multiple hazards, other factors may be considered and programmed into the Motor Vehicle Warning and Control System. This is especially possible with advanced image analysis such as the neural network implementation of the image analysis computer 19 herein before described. Using such advanced, high speed image recognition techniques will allow identifying pedestrians, animals, particular vehicle types such as trucks or other large and potentially very destructive collision objects. Special algorithmic sensitivity to avoid certain obstacles based on their respective identifications may also be programmed into processing block 98 of FIG. 13.

Having ranked the collision hazards in block 98, the Hazard/Collision state vector 82 can be modified in block 99. This operation permits indicating to the FAM selection block 78 of FIG. 6 which of the multiple detected hazards is currently the most dangerous. One approach is to downgrade all hazards except the most dangerous from a hazard to an obstacle in the Hazard/Collision state 82 of FIG. 10. This would ensure that the Fuzzy Associative Memory Selection block 76 of FIG. 6 would direct the system to the particular FAM most responsive to the highest ranking hazard as determined in processing block 98 of FIG. 13 while still instructing the system to avoid the other hazards.

It is also possible to set threshold levels for differences in parameter values as calculated and compared in the ranking of collision hazards in block 98 of FIG. 13. It may occur that multiple hazards are essentially of equal danger making it unwise to rank one higher than the other. In this case, block 99 of FIG. 13 would not upgrade one hazard over another, but rather would use an input in the form of the Hazard/Object state vector 82 that ranks both as hazards, permitting selection of a Fuzzy Associative Memory in block 76 of FIG. 6 that is best responsive to the multiple hazards.

Having evaluated front, back, right side and left side hazards, the flow diagram of FIG. 13 proceeds to set the object or obstacle bits OF, OB, OL and OR in the vector 82. Recall that front, back, left and right side obstacles are herein defined as objects which are not currently hazards but may become a hazard if the wrong evasive action is taken. Examples include vehicles approaching in adjacent lanes that are not on a collision course, automobiles safely behind the controlled vehicle, a tree by the side of the road, and so forth. Blocks 100 through 107 set bits OF, OB, OL, and OR depending on the presence or absence of front, back, left or right objects to be avoided in controlling the vehicle.

Figure 14:
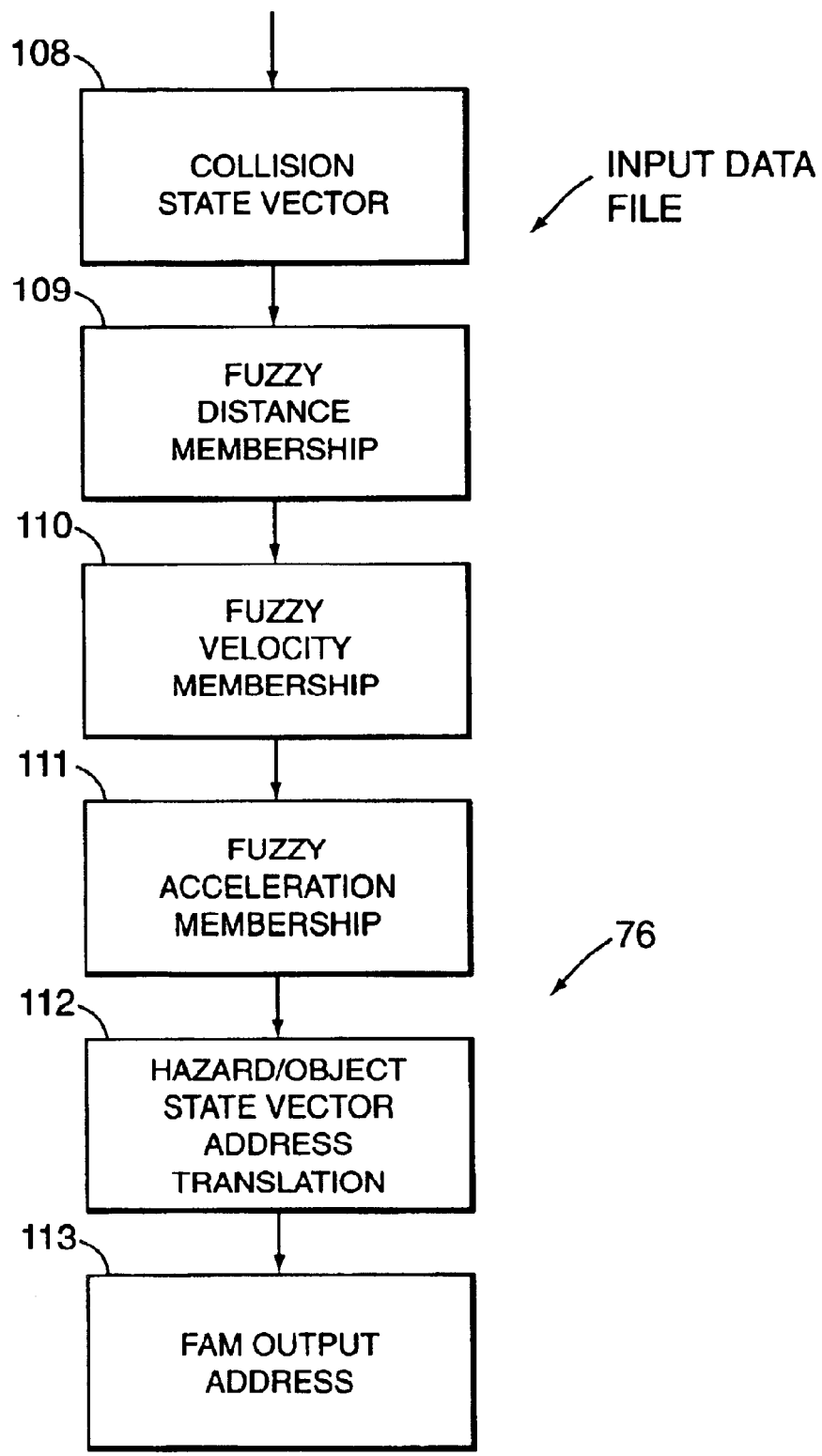
FIG. 14 is a more detailed logic flow diagram for the Fuzzy Associative Memory (FAM) selection processing.

FIG. 14 shows a more detailed flow diagram for the Fuzzy Associative Memory (FAM) Selection block 76 of FIG. 6. The collision vector inputs contain numerical values for relative distance, velocity, and acceleration of the vehicle and the impending hazard. Block 76 uses this information as indicated in FIG. 13 to decide the respective fuzzy membership grades. Fuzzy distance membership is decided in block 109; fuzzy velocity membership is decided in block 110; and fuzzy acceleration membership is decided in block 111. Once decided, these membership grades serves as indices for addressing the Fuzzy Associative Memories (FAM's) as illustrated in FIG. 9. Membership is determined in the respective cases by limits as indicated in FIG. 7.

The Hazard/Object state vector also serves as an index into the group of FAMs. A simple address translation provides the actual address of the FAM locations appropriate for the detected hazard/object combination indicated in the vector. Control signals are then directly read from the FAM ensuring rapid overall system response. Signals are immediately generated to control braking, steering and warning systems as shown in FIG. 6. These output signals are likewise treated as fuzzy variables with membership classes as shown in FIG. 7. Defuzzification takes place in processing block 81 of FIG. 6 as herein above described.

The Motor Vehicle Warning and Control System herein above described is capable of dealing with hundreds, or even thousands, of different combinations of variables representing image analysis data and vehicle motion parameters. Indeed, given the continuous nature of the variables, in the limit the number of situations is infinite. Control signal generation is implemented using the above described parallel image processing, fuzzy logic, and fuzzy associative memories (FAM's). While a complete logic flow diagram describing all possible flow scenarios is not practical, it is instructive to consider the system operation for a particular example situation. To this end, FIG. 15 illustrates the logical system flow based on the hereinabove described embodiment for the situation wherein the image analysis system detects a hazard in front of the controlled vehicle.

Figure 15:
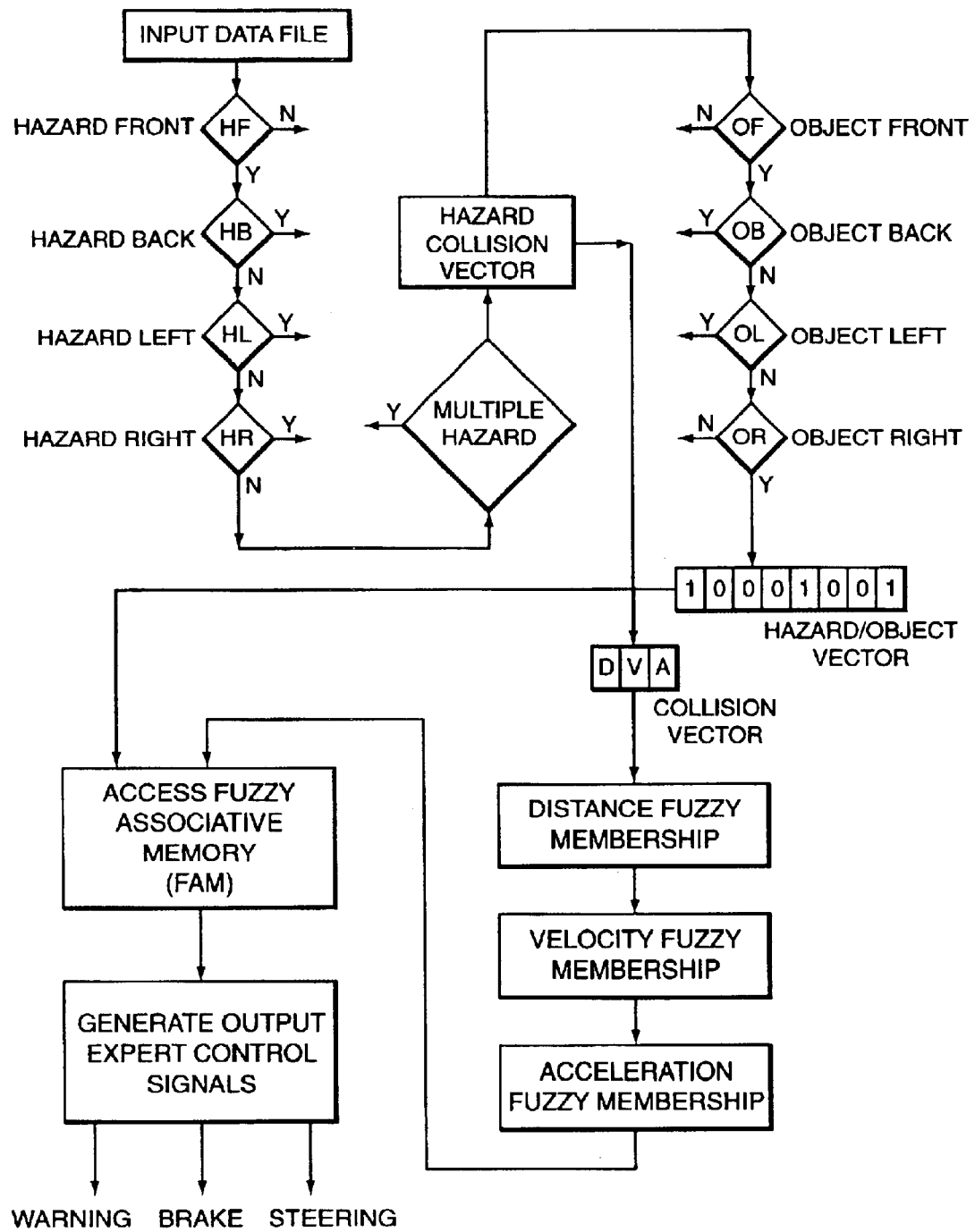
FIG. 15 is an example system flow illustrating the operation of the Motor Vehicle Warning and Control System.

The operation of the system with this scenario is as outlined in FIG. 15. The sensor input file is used to evaluate respective hazards. The result is the indication that a frontal hazard exists but no other hazards are present. The hazard collision vector is prepared with numerical values for relative distance, velocity and acceleration as indicated in FIG. 15. The system flow continues with an analysis of the presence of objects that might become hazards depending on the evasive action taken by the system. There is, of course, an object in the front of the vehicle, which is in fact the hazard of concern. An object is also detected to the right side of the vehicle, limiting evasive action in that direction. Using this information, the Hazard/Object vector becomes [10001001].

Using the collision vector for the hazard in front of the controlled vehicle, the Fuzzy Membership Grades for distance, velocity and acceleration are evaluated. Overlapping membership is possible depending on the values for the control variables. Using the combination of the Hazard/Object vector and Fuzzy Membership Grades, the FAM is accessed to determine the "expert" driving response control signals. The FAM entries indicate that the warning, braking, and angle steering to avoid the hazard or minimize danger to the vehicle. Defuzzification is used to determine exact output control variable values. The steering swerve, if any, will be to the left because of the object detected on the right side of the vehicle. With this information, appropriate warnings and displays are activated and control action is taken. Even if the driver does not respond to the warnings, the evasive control steps will tend to reduce the danger.

In the system of FIG. 6, a different FAM is used for each state vector of FIG. 12. Furthermore, as indicated in FIG. 9, different FAM tables are used for different relative accelerations of the controlled vehicle and the impending hazard. There are a total of 68 state vectors in FIGS. 12 and 6 different relative acceleration FAM tables in FIG. 9 yielding a total of 408 different FAM tables. The particular FAM of FIG. 9 corresponds to state vectors with a hazard in front of the vehicle only and no obstacles in the rear nor on at least one side. Thus this FAM may be used with state vectors 41, 42, and 43. It can be seen that a given FAM may be used with multiple state vectors, thereby reducing the number of actual required Fuzzy Associative Memories or FAM's.

It is important to understand that the Motor Vehicle Warning and Control System and Method herein described is based on the real time feedback control with fuzzy logic algorithms providing corrective action, the results of which are immediately analyzed by the warning control system using high speed image processing based on advanced parallel computing structures and/or neural network image analysis. The near instantaneous control response required to avoid or minimize the effects of a collision are not possible without adopting these techniques. Fuzzy logic permits incremental control when necessary with continuous real-time feedback. The results of this control are immediately sensed and further control action activated as necessary to minimize the danger presented by the hazard. This continuous closed loop operation closely emulates the response of a human driver with immediate visual feedback, rapid evaluation of alternatives, and reflexive response in handling a vehicle in a hazardous situation.

It is also important to note that the response rules programmed in the FAM's are "expert" driving rules for the specified conditions. These rules are defined by expert drivers and represent the best possible driving responses. Computer simulations and studies may also be used in defining these rules. This "Expert System" is designed to minimize driving mistakes in hazardous situations. Note that even verbal warnings corresponding to the driving hazard/ obstacle states are derived based on FAM defined expert driving responses. These warnings are delivered as described above via synthetic speech system 27 of FIG. 1. Thus the driver has the assistance of an on-board, real-time expert speaking to him or her and advising on the optimum driving response to a given roadway condition.

A further extension of the described system is responsive to visually or electronic detectable road markers such as lane markers, safe speed markers, curve warnings, or other hazard indicating devices installed along or in the roadway. The same system herein above described can be responsive to signals detected from such warnings and integrate this information into the overall vehicle control system.

In a modified form of the invention, it is noted that system 10 may also perform as a navigational computer informing the driver of the motor vehicle containing same of the location of the vehicle by controlling the display 32 to cause it to display characters describing such location and/or a map showing the road or street along which the vehicle is travelling and its location and direction of travel there along by means of an indicia such as an arrow. The map may graphically or by means of characters include auxiliary information such as towns and cities along the route of travel, distances thereto, alternate routes of travel, road conditions, information on traffic density, hazardous conditions, weather ahead, sightseeing information and other information derived via short wave or other receiving or input means which outputs digital codes to RAM memory 12 and/or other computer or microprocessor 11. Such information may be derived via earth satellite short wave transmission and/or local or roadside radio transmitters as the vehicle approaches and passes same and/or may be input via wire or short wave to a short wave receiver of the vehicle, such as its audio radio, receiver or an auxiliary receiver connected (via an analog-to-digital converter) to computer 11 via an input bus (not shown).

The memories 12 and 13 or other memories may also be programmed with trip or travel data derived via short wave, telephone line, microwave satellite or other communication system connected to a remote computer or by a select pluggable memory or recorder output. Vehicle instant location data codes may be received via satellite location or electronic triangulation and the codes generated may be employed to properly access map defining graphics data and to effect the display of the proper map graphics on the heads-up or video display 32.

A keyboard 82 and/or microphone (located, for example, in the steering wheel or steering wheel hub) of the vehicle and a speech recognition computer such as computer 25 may be employed by the driver to generate command control signals for controlling the trip or navigational computer and effecting the display and/or playback of synthetic speech of select information on the location, direction of travel, distances to select locations, towns or cities, map information or other information as defined above.

In yet another form of the invention, the memory 20 of the image analyzing computer 19 and/or an auxiliary memory therefor may contain image data derived from the output of a television camera on a vehicle travelling the same road, roads or route travelled by the driven vehicle containing system 10. Such image data may be derived from archival memory once the expected route or routes of travel is known, which achieved memory data was generated by computer processing the output of TV camera 16 of system 10 during previous travel of the vehicle along the same route and/or from TV scannings of other vehicles. Such previously generated image signal data may be utilized to improve or effect proper operation of system 10 by providing data on stationary objects and background, or road images along the route of travel.

Thus computer 11 may have (a) a microphone and analog to digital converter of speech signals connected thereto as well as (b) a short wave receiver of data and (c) an input keyboard as described.

Another form of the invention involves short wave (for example, microwave or infra-red) communication between two or more vehicles containing respective systems 10 to effect cooperative control functions to be performed by the computers of both vehicles. A short wave radio transmitter 86 is shown in FIG. 1 connected to microprocessor 11 to receive digital codes from the decision computer 23 which codes are generated when a hazardous driving or road condition is detected as described and may involve a collision with a vehicle travelling in the same or opposite direction as the vehicle containing system 10 which detects such condition. Such code signals sent by short wave microwave, radar or infra-red transmitter-receivers of either or both vehicles and/or other vehicles in the vicinity of the developing hazard may be employed on receipt to warn the driver of the other vehicle(s) of the hazardous condition with suddenly generated synthetic speech, flashing lights, tones, etc. and/or effect an automatic vehicle control operation such as an automatic braking and/or steering operation, as described, to avoid or reduce the effects of a collision. The infra-red communication system may involve code pulsed infra-red diodes or lasers and solid state receivers of infra-red light mounted on the front and rear bumpers of the vehicles.

It is also noted that system 10 may be employed with suitable software as described above, or with additional sensors or sensing systems added to the system to sense traffic lane times along roads and highways, active and/or passive signal or code generators and short-wave transmitters buried in the highway and/or at the side of the road travelled and/or supported by other vehicles, to automatically operate the vehicle containing such computerized system during the normal travel of such vehicle between two locations and/or destinations. For example, select highways or select sections of a highway may be designed and operable to accommodate (only) vehicles which are equipped with system 10 which is operable to steer and control the speed of the vehicle in accordance with control signals generated by the decision computer 23 when it is specially programmed to guide and control the speed of the vehicle in its travel along the select highway or road. To supplement the signals generated by the image analyzing computer 19, or as a replacement therefor, an auxiliary computer, not shown, may be provided connected to the control computer 11 and operable to receive and analyze information signals or codes generated as a result of digitizing the output(s) of one or more sensors on the vehicle sensing (a) highway marker or lane delineating lines, (b) curb and/or divider markings, (c) embedded or roadside code generators, or (d) electro-optically scannable indicia or reflectors along and/or at the side of the road or a combination thereof. The short wave receiver 84 may receive radio-frequency codes generated locally as the vehicle passes while one or more electro-optical scanning systems employing solid state lasers and photodetectors of the reflected laser light may be employed to provide such coded information which is processed by computer 19 or the auxiliary computer to provide vehicle control or operational signals which may be used per se or by the decision computer 23 to control and maintain control of the vehicle to keep it travelling in a select lane and at a select speed in accordance with the set speed for the highway or the select lane thereof along which the vehicle is travelling and/or the speed of other vehicles ahead of the computer controlled vehicle containing system 10.

A further enhancement of the herein defined automated vehicle warning system makes use of a separate driver monitoring computer to constantly monitor driver actions and reactions while operating the vehicle. This type of monitoring is especially helpful in determining driver fatigue or detecting erratic driving patterns caused for example, from driving while intoxicated or under the influence of drugs. Erratic driving patterns may include swerving in steering of the vehicle, uneven or unnatural acceleration or deceleration, combinations of unusual or unnatural driving patterns, driving much slower or faster than other vehicles around the automobile being monitored, unnatural sequences of exercising control over the vehicle such as alternate braking and acceleration, braking or stopping in a flowing traffic stream, or excessive acceleration. Also, driving patterns inconsistent with surrounding vehicle motion can be detected such as any action by the driver that increases rather than decreases the possibility of a collision in a dangerous or hazardous situation. A separate driver monitoring system can detect all of these situations and respond by warning the driver or, if necessary, activating the automated vehicle control system.

The motor vehicle warning and control system can warn other vehicles of an impending or detected possible collision by flashing exterior warning lights and/or sounding audible alarms including the horn. The system may also warn other vehicles via radio transmission which activates warnings in adjacent vehicles of dangerous situations. Drivers of other vehicles can then be warned by audible or visual warning devices and/or displays and can take necessary evasive action. The radio signal can also alert police or highway patrolmen of dangerous driving patterns by identifying the vehicle. As a further extension, the vehicle may have an electronic location system such as satellite Global Position System (GPS) electronics permitting precision vehicle location, which information can be transmitted with the hazard warning signals, permitting law enforcement and roadway safety personnel to precisely locate the vehicle detected as being in a hazardous situation caused by the driver or other conditions.

A further enhancement of the vehicle warning and control system and method disclosed herein makes use of a recorder to record the last several minutes of driving action for future analysis. Such recordings permit reconstruction of events leading up to collision permitting more accurate determination of causes including fault.

What is claimed is:

1. A system for operating and controlling a motor vehicle having a power-drive system and controls including an accelerator, a brake, and a steering system comprising:

(a) a ranging device supported by the vehicle, directed toward the front of the vehicle, and structured to generate first signals indicating the distance to and relative motion of some objects in front of the vehicle;

(b) a detector supported by the vehicle, directed away from the vehicle in a direction other than the front of the vehicle, and structured to generate second signals identifying whether there is an object in said other direction; and (c) a fuzzy logic-based computer having a memory containing a plurality of sets of fuzzy inference vehicle control rules, each rule defining a coordinated combination of changes to the vehicle's steering and acceleration;

(d) wherein the computer is coupled to the ranging device and the detector and structured to use the first and second signals to select and reproduce from the memory a selected one of the plurality of sets of rules and to apply the selected set of rules to derive command signals with fuzzy logic;

(e) wherein the computer is electrically coupled to the controls;

(f) whereby the command signals are applied to control the accelerator, brake, and steering system of the vehicle in a coordinated way to attempt to avoid collisions between the vehicle and objects in its path of travel without taking evasive action that would cause a collision with objects detected in said other direction.

2. A system in accordance with claim 1 further comprising a visual display inside the vehicle coupled to the ranging device and driven by the first signals to generate symbols representative of objects in the path of the vehicle.

3. A system in accordance with claim 2 wherein the visual display comprises a heads-up display aimed to project images of intelligible information on a front windshield of the vehicle.

4. A system in accordance with claim 1 further comprising a synthetic speech generating system coupled to the computer and driven by the command signals to generate sounds of select words of speech.

5. A system in accordance with claim 1 further comprising a warning device coupled to the ranging device and driven by the first signals to generate a warning signal perceptible to a human when one of the objects is in the path of the vehicle, and wherein the computer is timed to control the operation of the vehicle only if the controls of the vehicle are not first altered sufficiently to avoid a collision with the object in response to indication by the warning device that an obstacle is in the path of travel of the vehicle.

6. A system in accordance with claim 1 wherein the ranging device comprises an image-generating camera.

7. A system in accordance with claim 1 wherein the ranging device comprises a radar-based ranging system.

8. A system in accordance with claim 1 further comprising an override controller coupled to the computer so as, when activated by a driver, to prevent the command signals from controlling the motor vehicle.

* * * * *